United States Patent
Chisu et al.

(10) Patent No.: US 12,284,667 B2
(45) Date of Patent: Apr. 22, 2025

(54) USER COMMUNICATION SYSTEM THAT DETERMINES CARRIER AGGREGATION OR DUAL CONNECT COMMUNICATION DEMAND REQUIREMENT FOR PRIMARY BAND SELECTION

(71) Applicant: MOTOROLA MOBILITY LLC, Wilmington, DE (US)

(72) Inventors: Daniel C Chisu, Franklin Park, IL (US); Armin W Klomsdorf, Chicago, IL (US); Yui J Chin, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 443 days.

(21) Appl. No.: 17/810,655

(22) Filed: Jul. 5, 2022

(65) Prior Publication Data
US 2024/0015777 A1    Jan. 11, 2024

(51) Int. Cl.
*H04W 72/542*   (2023.01)
*H04W 28/02*    (2009.01)
*H04W 76/15*    (2018.01)

(52) U.S. Cl.
CPC ..... *H04W 72/542* (2023.01); *H04W 28/0231* (2013.01); *H04W 76/15* (2018.02)

(58) Field of Classification Search
None
See application file for complete search history.

(56) References Cited

U.S. PATENT DOCUMENTS

| | | | |
|---|---|---|---|
| 2017/0265205 A1* | 9/2017 | HomChaudhuri | H04B 7/0413 |
| 2019/0058570 A1* | 2/2019 | Zhang | H04W 72/56 |
| 2019/0319814 A1* | 10/2019 | Das | H04W 48/18 |
| 2019/0319858 A1* | 10/2019 | Das | H04L 12/2803 |
| 2019/0320250 A1* | 10/2019 | Hoole | H04J 3/1652 |
| 2019/0349848 A1* | 11/2019 | Bali | H04W 16/14 |
| 2019/0364492 A1* | 11/2019 | Azizi | H04W 4/024 |
| 2020/0205062 A1* | 6/2020 | Azizi | H04W 4/46 |
| 2020/0245390 A1* | 7/2020 | Ali | H04W 36/00698 |
| 2021/0168476 A1* | 6/2021 | Das | H04W 16/14 |
| 2021/0289275 A1* | 9/2021 | Das | H04L 5/0041 |
| 2021/0352487 A1* | 11/2021 | Routt | H04W 72/542 |
| 2021/0385702 A1* | 12/2021 | Damnjanovic | H04L 5/0098 |
| 2022/0007202 A1* | 1/2022 | Routt | H04W 24/02 |

(Continued)

*Primary Examiner* — Faiyazkhan Ghafoerkhan
(74) *Attorney, Agent, or Firm* — Isidore PLLC

(57) ABSTRACT

A communication system, a method, and a computer program product provide selecting and camping on primary band in idle mode in preparation for supporting a data connection for demanding application(s) to a network system. Preparation includes determining a communication demand requirement associated with the at least one application comprising at least one of data throughput greater than a throughput threshold and data latency less than a latency threshold. The communication system identifies, selects, and camps on the primary band in preparation for activation of the at least one application and configures the RF communication subsystem to use the at least one secondary band in preparation for activation of the at least one application and for establishment of the data connection with the communication network to operate in at least one of carrier aggregation mode and dual connection mode to satisfy a communication demand requirement.

20 Claims, 11 Drawing Sheets

(56) References Cited

U.S. PATENT DOCUMENTS

| | | | |
|---|---|---|---|
| 2022/0046343 A1* | 2/2022 | Hoole | H04W 16/14 |
| 2022/0182742 A1* | 6/2022 | Bali | H04L 5/0041 |
| 2022/0287124 A1* | 9/2022 | Ali | H04W 74/0833 |
| 2022/0295589 A1* | 9/2022 | Tsai | H04B 17/382 |
| 2022/0303812 A1* | 9/2022 | Chung | H04W 72/542 |
| 2022/0303881 A1* | 9/2022 | Menon | H04W 28/0858 |
| 2023/0050403 A1* | 2/2023 | Das | H04L 41/5003 |
| 2023/0138578 A1* | 5/2023 | Azizi | H04W 4/46 370/329 |
| 2023/0189191 A1* | 6/2023 | Wang | H04W 36/00226 370/329 |
| 2024/0015777 A1* | 1/2024 | Chisu | H04W 48/18 |
| 2024/0073796 A1* | 2/2024 | Azizi | H04L 67/51 |
| 2024/0098393 A1* | 3/2024 | Das | H04L 12/2801 |
| 2024/0196477 A1* | 6/2024 | Sunell | H04W 76/34 |
| 2024/0284082 A1* | 8/2024 | Hoole | H04L 5/0041 |

* cited by examiner

USER COMMUNICATION SYSTEM THAT DETERMINES CARRIER AGGREGATION OR DUAL CONNECT COMMUNICATION DEMAND REQUIREMENT FOR PRIMARY BAND SELECTION

RELATED APPLICATIONS

The present application is related to the following co-pending U.S. patent application Ser. No. 17/810,648 entitled "Primary Band Selection by a Carrier Aggregation or Dual Connect Aware Communication Device" and Ser. No. 17/810,650 entitled "Primary Band Selection by a User Communication System Based on Predicting Carrier Aggregation or Dual Connection", both filed concurrently herewith, with relevant content of each related application being incorporated herein by reference.

BACKGROUND

1. Technical Field

The present disclosure relates generally to a communication device that supports simultaneous communication, and more particularly to a communication device that supports simultaneous communication using more than one communication chain for carrier aggregation or dual connection.

2. Description of the Related Art

Communication devices are increasingly being designed to support concurrent communication (i.e., concurrent transmission and/or concurrent reception) via more than one communication chain. For example, in moving from fourth generation long term evolved (LTE) radio access technology (RAT) to fifth generation new radio (5G NR) RAT, communication devices typically have increased the number of communication chains that operate simultaneously. A typical LTE communication device has a maximum of two transmitters that are simultaneously active, one LTE transmitter and one Wi-Fi transmitter. A 5G NR communication device can have up to two 5G NR transmitters in multiple input multiple output (MIMO) operation, one LTE transmitter, and two Wi-Fi transmitters in MIMO operation. 5G non-standalone (NSA) mode is an option for 5G NR deployment that enables using both a 5G NR transmitter and the LTE transmitter to meet data throughput and data latency demand requirements. NSA mode is also referred to as E-UTRAN new radio—dual connectivity (ENDC) or merely "dual connectivity". E-UTRAN is an acronym for evolved Universal Mobile Telecommunications Service. Instead of dual connectivity, a radio frequency (RF) communication subsystem of the communication device can support concurrent transmission and/or concurrent reception using carrier aggregation for increased data throughput and/or reduced data latency. In carrier aggregation mode, a primary band and one or more secondary bands operate cooperatively to satisfy a communication demand requirement for at least one application executed by the communication device.

During a boot mode or during idle mode without an active data connection, the communication device selects and camps on a primary band according to a default selection procedure that considers network-defined band priority and selection thresholds relative to the signal measurements from the communication device. However, currently, communication devices do not consider its own band support and ENDC capabilities when selecting the best primary band. As a result, the default selection procedure may select a primary band that has the strongest signal strength or best signal quality yet be wholly inadequate for the communication demand requirements of a more bandwidth/latency demanding application that prompts a data connection to the default primary band. In an example, a particular network node may be closest to the communication device but has a large number of other communication devices connected, limiting communication resources that can be assigned to the requesting application (or communication device) after data connection. In an example, the primary band selected according to default selection procedure may not provide support for an initial combination of a primary band and at least one secondary band carrier aggregation or dual connection with sufficiently data throughput or sufficiently low data latency for the communication demand requirement. A delay occurs before the default selection of a primary band hands over the communication device to another combination of primary band and secondary band(s) to meet the communication demand requirement, reducing the user experience.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
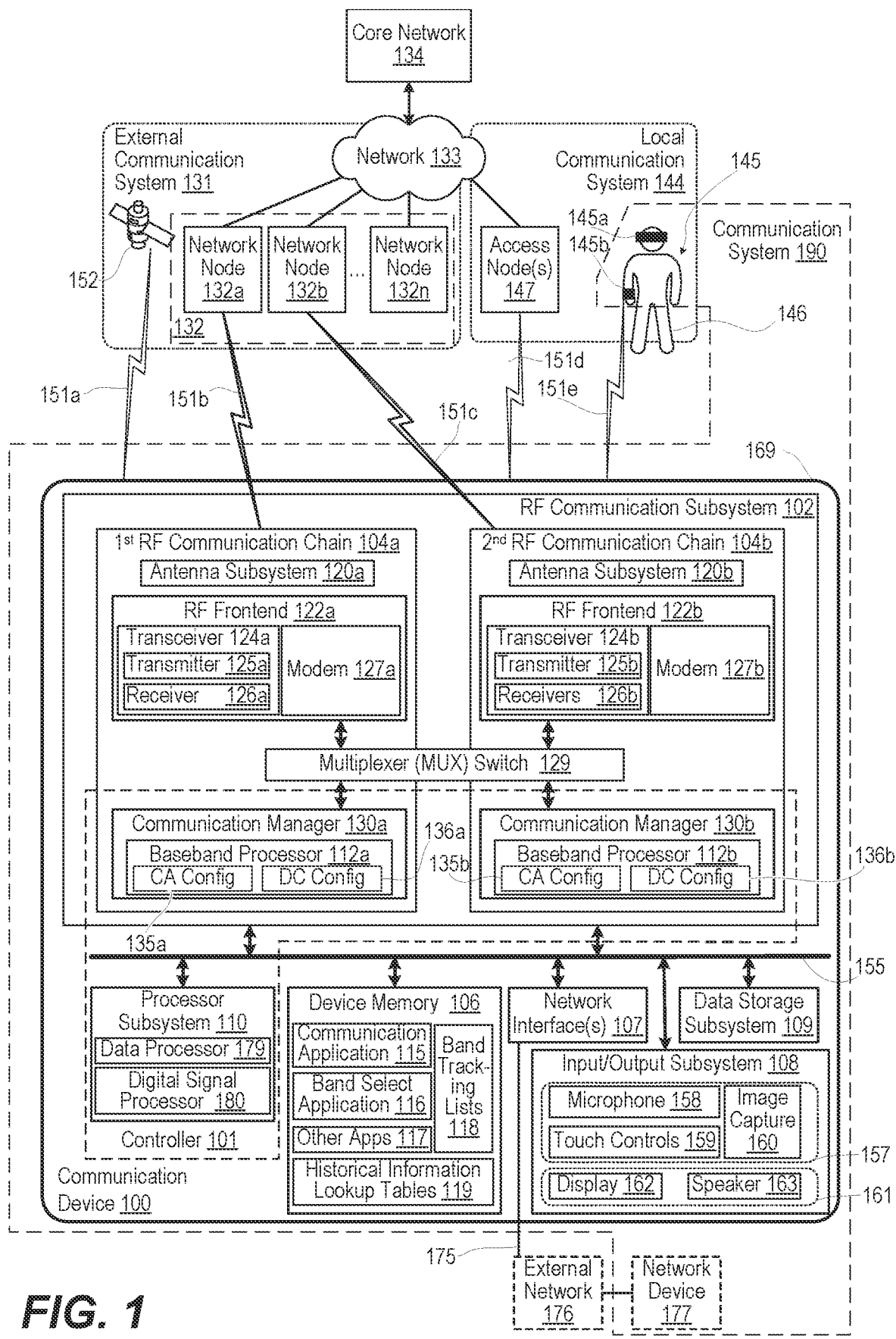
FIG. 1 depicts a functional block diagram of a communication environment with a communication system having a radio frequency (RF) communication subsystem that selects and camps on a primary cell or band that is selected in preparation for carrier aggregation or dual connection based on a predicted activation of a demanding application, according to one or more embodiments.

According to a first aspect of the present disclosure, a communication system, a method, and a computer program product that select and camp on a primary band in idle mode in preparation for supporting an anticipated data connection for one or more demanding applications. The preparation includes determining, for at least one demanding application, a communication demand requirement that includes at least one of: (i) data throughput greater than a throughput threshold; (ii) data latency less than a latency threshold; and (iii) at least a minimum level of quality. In one or more embodiments, a controller of the communication system determines the communication demand requirement by accessing a data entry in a lookup table stored in the device memory, the lookup table containing the communication demand requirement indexed to the at least one demanding application. Alternatively, or in addition, the controller monitors communication performance determined by the RF communication subsystem during one or more prior activations of the at least one demanding application. The controller stores or updates, in the lookup table, the communication demand requirement that is sufficient to support the at least one demanding application during a subsequent activation based on the one or more prior activations of the application.

The communication device includes at least one user interface device, the memory containing the lookup table, a radio frequency (RF) communication subsystem, and a controller that is communicatively coupled to the at least one user interface, the memory, and the RF communication subsystem. The memory also stores at least one application that, when activated, has a communication demand requirement that cannot be satisfied by a connection to a single communication chain. In one or more embodiments, the communication demand requirement includes at least one of: (i) data throughput greater than a throughput threshold; (ii) data latency less than a latency threshold; and (iii) at least a minimum level of quality for data that is originating or terminating at the at least one user interface. The RF communication subsystem has more than one communication chain comprising at least a first communication chain and a second communication chain configurable to operate in at least one of carrier aggregation mode and dual connection mode to satisfy the communication demand requirement.

In one or more embodiments, the communication system prepares to meet the communication demand requirement regardless of whether or not activation of the demanding application is anticipated. In one or more embodiments, the communication system prepares to meet the communication demand requirement when activation of the demanding application is determined to be occurring. In one or more embodiments, the controller monitors for one or more trigger events based one or more of a configuration of the communication system, context of use of the communication system, and user interaction with the at least one user interface device. Then the controller predicts, based on detecting the one or more trigger events, that the at least one application will require a data connection with a communication network. The controller scans, using components of the RF communication subsystem, one or more available network nodes to assess communication capacity. The controller identifies a combination of a primary band and at least one secondary band of the one or more available network nodes that satisfies the communication demand requirement. The controller selects and camps on the primary band in preparation for activation of the at least one application and configures the RF communication subsystem to use the at least one secondary band in preparation for activation of the at least one application and establishment of the data connection with the communication network.

While the communication device is unconnected state to a network device such as in idle mode, the communication device scans supported frequency bands to detect and identify primary cells or primary bands that are candidates for selection ("selection candidates"). In one aspect, the communication device sorts the selection candidates based on factors such as network-defined band priority and signal strength/quality to support the generally-known ("default") approach. In another aspect, the communication device may also scan for additional information to ensure that throughput and latency requirements are met when connecting to a serving cell is used as a primary band or cell to support a bandwidth, latency or quality demands (BLQD) of an activated application. The BLQD of the application is higher than normal, so the application is deemed "demanding". In particular, the communication device detects and identifies a capacity of a primary band to support carrier aggregation using one RAT or support a dual connection using two different RATs such as 4G LTE and NR 5G. Throughput and latency are primarily driven by several factors such as the channel frequency, bandwidth, number of available Component Carriers (CCs), and subcarrier spacing. Band priority, as defined by the network and signal strength alone, cannot truly guarantee the best user experience. In particular, a primary band or cell is selected that has the capacity to support carrier aggregation or a dual connection. The capacity to service a carrier aggregation combination of a dual connection of a primary band and at least one secondary band is assessed by aggregating the widest bandwidth, highest number of CCs and largest subcarrier spacing. The communication device proactively performs this assessment, and selection based on the assessment, prior to entering a radio resource control (RRC) connected state. By proactively and unilaterally preparing to meet the communication demand requirements before establishing a data connection, the communication device avoids a delay when a default selection would result in the need to handoff the data connection to another network device. This delay occurs because the serving network device that cannot satisfy the communication demand requirements. In response, the serving network device has to belatedly signal handover commands based on measurements from the communication device.

The primary band selection provides a better user experience based on one or more of: (i) sufficiently high data throughput; (ii) sufficiently low data latency; and (iii) at least a minimum level of service. The communication device can determine when the enhanced communication capacity is not required, reverting to default primary band selection to achieve increased battery service life. The selection of the best primary band and secondary band(s) combination for carrier aggregation or dual connection is accomplished by automatic controller action for any real-time field condition, without relying on a delayed reaction by the network to reassign support for the data connection. Thereby, the simultaneous transmissions for carrier aggregation or dual connection have steady communication performance from the start of the data connection, potentially avoiding primary band handovers. The selection of the primary band is synchronized with user applications performed by the communication device. Aspects of the present innovation are applicable to current new radio fifth generation (NR 5G) radio access technology (RAT) and future sixth generation (6G) RATs and beyond.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

FIG. 1 is a functional block diagram of a communication system comprised of multiple electronic devices in an operating environment within which the features of the present disclosure are advantageously implemented. When not in active data communication with a communication network, the communication system prepares to meet a communication demand requirement of one or more electronic devices, and in particular, communication device 100. Communication device 100 is an example of an electronic device having RF communication subsystem 102 that supports multiple transmission uplinks and downlinks by a plurality of radio frequency (RF) communication chains 104a-104b configurable for carrier aggregation and/or dual connection. For clarity, first and second RF communication chains 104a-104b are depicted; however, communication device 100 can include more than two RF communication chains 104a-104b. In addition, the plurality of RF communication chains 104a-104b can include different subsets that support concurrent transmission and/or reception on different communication frequency bands. Communication device 100 may perform carrier aggregation or dual connection in two or more different communication frequency bands.

Communication device 100 can be one of a host of different types of devices, including but not limited to, a mobile cellular phone, satellite phone, or smart-phone, a laptop, a net-book, an ultra-book, a networked smartwatch or networked sports/exercise watch, and/or a tablet computing device or similar device that can include wireless communication functionality. As a device supporting wireless communication, communication device 100 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices connected to a wireless modem.

Referring now to the specific component makeup and the associated functionality of the presented components within communication device 100. In addition to RF communication subsystem 102, communication device 100 includes controller 101, device memory 106, network interface(s) 107, input/output (I/O) subsystem 108, and data storage subsystem 109, which are each managed by controller 101. Controller 101 may include or consist essentially of processor subsystem 110. In one or more embodiments, controller 101 also includes one or more baseband processors 112a-112b of respective RF communication chains 104a-104b. Device memory 106 stores program code for applications, such as communication application 115, band selection application 116, and other applications 117. Device memory 106 further includes an operating system (OS), a firmware interface, such as basic input/output system (BIOS) or Uniform Extensible Firmware Interface (UEFI), and firmware.

Controller 101 includes processor subsystem 110, which executes program code to provide operating functionality of communication device 100. The functionality includes (i) configuring RF communication subsystem 102 for carrier aggregation or dual connection to increase throughput and/or to reduce data latency, when necessary, and (ii) configuring RF communication subsystem 102 to camp on a default primary band when carrier aggregation or dual connection are not necessary. The default primary band is selected for having a strong signal for control signal coverage without regard for whether the default primary band can provide sufficient data throughput, latency or quality when carrier aggregation or a dual connection is required. Communication device 100 may avoid unnecessary power consumption to camp on a more distant network device that can support carrier aggregation or dual connection. Communication device 100 may also minimize power consumption in detecting and selecting combinations of a primary band and at least one second band that can support carrier aggregation or dual connection. Processor subsystem 110 of controller 101 can execute program code of communication application 115, band selection application 116, and other applications 117 to configure communication device 100 to perform specific functions. The software and/or firmware modules have varying functionality when their corresponding program code is executed by processor subsystem 110 or secondary processing devices within communication device 100. Device memory 106 can include data used by the applications. Band selection application 116 monitors for contextual triggers that indicate communication application 115 is expected to be activated. In an example, RF communication subsystem 102 may wirelessly pair with personal device(s) (145), such as helmet mounted display device 145a. Historically, the wireless pairing operation precedes and/or is followed by XR services being initiated. In order to select an appropriate primary band and at least one secondary band to support activation of communication application 115, band selection application 116 maintains band tracking lists 118. RF communication subsystem 102 may wirelessly pair with other personal device(s) (145), such as smartwatch 145b that is associated with nominal or normal (i.e., very low) communication demand requirements. Band selection application 116 monitors for historical information associated with activation of demanding applications to improve future preparations for similar activations in historical information lookup tables 119.

In an example, band tracking lists 118 includes a first list: "detected band list" of detected bands and cells that is sorted on network priority and signal power/quality. Each entry includes channel bandwidth, number of component carriers (CCs), and subcarrier spacing. Band tracking lists 118 includes a second list: "supported combinations list" of suitable primary band and at least one secondary band combinations that communication device 100 can be configured to support if available for carrier aggregation or dual connection. In an example, the supported combinations list omits any defined RF bands for which communication device 100 lacks the ability to transmit or receive. Band tracking lists 118 includes a third list: "detected combinations list" of primary band and at least one secondary band combinations that are suitable for carrier aggregation or dual connection that are both indicated as supported in the supported combinations list and detected as available at a location of communication device 100. The detected combinations list may be filtered for combinations spanning the largest aggregate bandwidth, number of CCs, maximum carrier spacing, and number of highest frequency bands. Band tracking lists 118 includes a fourth list: "best detected primary band list" of bands or cells sorted in selection priority. The communication device loops or scans through the detected combination list and pulls or identifies a highest remaining combination for which the primary band or cell is at the top of detected band list. The primary band will provide carrier aggregation or dual connection combinations that offer a balance of largest bandwidth, number of CCs, and carrier spacing, while meeting network-defined band priority and signal quality thresholds.

Controller 101 processes band selection application 116, which accesses the third list and creates and maintains the first, second, and fourth lists. In an example, the hardware and software configuration of communication device 100 enable certain communication in particular RF bands. An original equipment manufacturer (OEM) can install these capabilities as the third list for reference by controller 101. When triggered to prepare for activation of demanding communication application 115, controller 101 executes band selection application 116 to select a primary band or cell at the top of the fourth list (i.e., the best detected primary band list) and attempt to camp on the primary band or cell at the top of fourth list. If unsuccessful, band selection application 116 selects the next lower priority primary band entry in the fourth list and attempts to camp on the next primary band. Band selection application 116 re-evaluates the first, third, and fourth lists when changes in device location or movement rate are sufficient to trigger re-evaluation. Fading of a particular signal often corresponds to changes in location. Movement rate over time results in a change in location. Location sensing or motion sensing can thus be used as triggers for re-evaluating available network devices.

In the recent past, cellular data service has been provided in part by a third generation (3G) RAT referred to as Universal Mobile Telecommunications Service (UMTS). Fourth generation (4G) RAT of evolved UTMS radio access (E-UTRA), referred to a Long Term Evolved (LTE), has largely replaced 3G UMTS for broadband, packet-based transmission of text, digitized voice, video, and multimedia. A fifth generation (5G) RAT, referred to as fifth generation new radio (5G NR), is being deployed to at least augment capabilities of 4G LTE with a yet higher capability of data transfer.

Each RF communication chain 104a-104b of RF communication subsystem 110 includes respective antenna subsystems 120a-120b that support various RF bands for wireless and cellular services. To support newer (RATs and multi band operation, antenna subsystems 120a-120b may be configured for dual low band (2L) or quad low band (4L) multiple input multiple output (MIMO) operation that dictates that multiple antennas communicate on multiple bands simultaneously. In one or more embodiments, antenna subsystems 120a-120b supports lower frequency bands, such as ultra-high band (UHB), and higher frequency bands, such as millimeter Wave (mmWave). 5G NR RAT includes use of mmWave bands in addition to the lower frequency bands of prior RATs.

Each RF communication chain 104a-104b includes respective RF frontends 122a-122b having one or more transceivers 124a-124b that includes one or more transmitters 125a-125b and one or more receivers 126a-126b. Multiplexer (MUX) switch 129 selectively connects communication managers 130a-130b to RF frontends 122a-122b. In one configuration, MUX switch 129 connects communication manager 130a to RF frontend 122a and connects communication manager 130b to RF frontend 122b, such as for cyclic delay diversity or independent transmissions. In another configuration, only one RF communication chain 104a-104b is required. One of RF frontends 122a-122b may be inactive when not needed for carrier aggregation, dual connection, or multiple independent transmissions. MUX switch 129 connects either communication manager 130a to RF frontend 122a or connects communication manager 130b to RF frontend 122b. MUX switch 129 connects one of communication managers 130a-130b to both RF frontends 122a-122b, with the other one of communication managers 130a-130b being inactive. Each RF communication chain 104a-104b includes respective ones of one or more modems 127a-127b.

Each RF communication chain 104a-104b includes respective communication manager 130a-130b having corresponding baseband processor 112a-112b. Baseband processors 112a-112b communicates with controller 101 and respective RF frontend 122a-122b. In one or more embodiments, baseband processor 112a-112b performs a primary or support function as part of controller 101. RF communication subsystem 102 communicates with external communication environment 131. Baseband processors 112a-112b operate in baseband frequency range to encode data for transmission and to decode received data, according to a communication protocol. Modems 127a-127b modulate baseband encoded data from corresponding communication managers 130a-130b onto a carrier signal to provide a transmit signal that is first amplified by power amplifiers in transmitters 125a-125b and then delivered to antennas. Modems 127a-127b demodulate received signals detected by corresponding antenna subsystem 120a-120b from external communication environment 131. The received signal is amplified and filtered by receivers 126a 126b, which demodulate received encoded data from a received carrier signal. In an example, RF communication subsystem 102 communicates with cellular network nodes 132 that are part of one or more radio access network (RANs) to connect to communication network(s) 133. Communication network(s) 133 may be communicatively connected to core network 134.

Baseband processors 112a-112b each include a respective carrier aggregation (CA) configuration component 135a-135b to operate in carrier aggregation. Baseband processors 112a-112b each include dual connection (DC) configuration component 136a-136b to configure for dual connection in two different RATs, such as 4G LTE and NR 5G.

5G non-standalone (NSA) mode is an option for 5G NR deployment. NSA mode is also referred to as evolved UTMS radio access network and new radio dual connectivity (ENDC). Unlike previously deployed RATs, ENDC actually utilizes two types of RATs at the same time. The 5G NSA mode depends on the control plane of an existing LTE network for connectivity control signaling. LTE network can also be the sole RAT in 5G NSA mode that provides data transfer service. Alternatively, the LTE network can signal for augmentation by, or sole reliance on, 5G NR for data transfer services. Communication devices 100 may remain connected to both 4G LTE and 5G NR or remain connected to just 4G LTE.

In other applications, local communication environment 144 can include localized or personal devices 145, such as a wireless headset, head mounted display device 145a, and smartwatch 145b. In an example, helmet mounted display device 145a is supported by communication application 115 to provide extended reality (XR) services to user 146. XR may include Virtual Reality (VR), which is a rendered version of a delivered visual and audio scene. The rendering is designed to mimic the visual and audio sensory stimuli of the real world as naturally as possible to an observer or user as they move within the limits defined by the application. XR may include Augmented reality (AR), which provides a user with additional information, artificially generated items, or content overlaid upon their current environment. XR may include Mixed reality (MR), which is an advanced form of AR where some virtual elements are inserted into the physical scene with the intent to provide the illusion that these elements are part of the real scene. These XR services can impose communication demand requirements on RF communication subsystem 102.

Local communication environment 144 can further include access nodes 147 for wireless communication. Communication devices 100 can be provided communication services by wide area network(s) that are part of external communication environment 131 and linked to access nodes 147. Wide area network(s) may also provide data services to communication network(s) 133 that provide communication service to communication device 100 via cellular network nodes 132.

RF communication subsystem 102 can concurrently transmit multiple uplink channels and receive multiple downlink channels. In an example, RF communication subsystem 102 receives satellite broadcast signals 151a from GPS satellites 152. RF communication subsystem 102 communicates with network nodes 132 via uplink/downlink channels 151b-151c. RF communication subsystem 102 can communicate with access node 147 via transmit/receive signals 151d. RF communication subsystem 102 communicates with localized or personal device 145 via transmit/receive signals 151e.

In one or more embodiments, controller 101, via RF communication subsystem 102, performs multiple types of cellular OTA or wireless communication with external communication environment 131. RF communication subsystem 102 can communicate via Bluetooth connection with one or more personal access network (PAN) devices such as localized or personal devices 145. Communication via Bluetooth connection includes both transmission and reception via a Bluetooth transceiver device. In one or more embodiments, RF communication subsystem 102 communicates with one or more locally networked devices via a wireless local area network (WLAN) link provided by access node 147. In one or more embodiments, access node 147 supports communication using one or more IEEE 802.11 WLAN protocols. Access node 147 is connected to wide area network(s), such as the Internet. In one or more embodiments, RF communication subsystem 102 communicates with GPS satellites 152 to obtain geospatial location information.

Data storage subsystem 109 of communication device 100 includes data storage device(s). Controller 101 is communicatively connected, via system interlink 155, to data storage device(s). Data storage subsystem 109 provides applications, program code, and stored data on nonvolatile storage that is accessible by controller 101. For example, data storage subsystem 109 can provide a selection of applications and computer data such as band selection application 116. Band select application 116 can be loaded into device memory 106 for execution by controller 101. In one or more embodiments, data storage device(s) can include hard disk drives (HDDs), optical disk drives, and/or solid-state drives (SSDs), etc. Data storage subsystem 109 of communication device 100 can include removable storage device(s) (RSD(s)), which is/are received in an RSD interface. Controller 101 is communicatively connected to the RSD, via system interlink 155 and the RSD interface. In one or more embodiments, the RSD is a non-transitory computer program product or computer readable storage device. Controller 101 can access the RSD or data storage device(s) to provision communication device 100 with program code, such as code for band selection application 116.

I/O subsystem 108 includes at least one user interface device that originates or terminates data. In an example, I/O subsystem 108 includes input interface devices 157 such as microphone 158, touch controls 159, and image capture device 160. I/O subsystem 108 further includes output interface devices 161 such as display 162 and audio speaker 163. Controller 101 can monitor input interface devices 157 to detect user interactions that include, without limitation, a gesture, a spoken sound, a volitional bioelectrical signal, a tactile motion, and an eye gaze direction. I/O subsystem 108 may also include acceleration/movement sensor(s), vibration output device, and light output device. I/O subsystem 108 also may include an I/O controller. The I/O controller provides communication and power signals to functional components described herein as part of RF communication subsystem 102, device memory 106, I/O subsystem 108, or data storage subsystem 109. The I/O controller connects to internal devices, which are internal to housing 169, and via an electrical cable to tethered peripheral devices, which are external to housing 169 of communication device 100. Internal devices can include computing, storage, communication, or sensing components depicted within housing 169. The I/O controller supports the necessary configuration of connectors, electrical power, communication protocols, and data buffering to act as an interface between internal devices and peripheral devices tethered by the electrical cable and other components of communication device 100 that use a different configuration for inputs and outputs.

Network interface(s) 107 can include a network interface controller (NIC) with a network connection/cable 175 connection to external network 176. Network interface(s) 107 support one or more network communication protocols. External network 176 can be a local area network (LAN), a campus area network (CAN), a metropolitan area network (MAN), or a wide area network (WAN). For example, network connection/cable 175 can be an Ethernet connection/cable. Network device 177 is communicatively coupled to wired area network 176.

Controller 101 manages, and in some instances directly controls, the various functions and/or operations of communication device 100. These functions and/or operations include, but are not limited to including, application data processing, communication with second communication devices, navigation tasks, image processing, and signal processing. In one or more alternate embodiments, communication device 100 may use hardware component equivalents for application data processing and signal processing. For example, communication device 100 may use special purpose hardware, dedicated processors, general purpose computers, microprocessor-based computers, micro-controllers, optical computers, analog computers, dedicated processors and/or dedicated hard-wired logic.

Controller 101 includes processor subsystem 110, which includes one or more central processing units (CPUs), depicted as data processor 179. Processor subsystem 110 can include one or more digital signal processors 180 that are integrated with data processor 179. Processor subsystem 110 can include other processors that are communicatively coupled to data processor 179, such as baseband processors 112a-112b of corresponding communication managers 130a-130b. In one or embodiments that are not depicted, controller 101 can further include distributed processing and control components that are external to housing 169 or grouped with other components, such as I/O subsystem 108. Data processor 179 is communicatively coupled, via system interlink 155, to device memory 106. In one or more embodiments, data processor 179 is communicatively coupled via system interlink 155 to RF communication subsystem 102, I/O subsystem 108, and data storage subsystem 109.

System interlink 155 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (system interlink 155 are illustrated in FIG. 1, it is to be understood that more, fewer, or different interconnections may be present in other embodiments.

In one or more embodiments, aspects of the present innovation are performed by communication device 100 as a unitary device that includes communication application 115 that is demanding by requiring more than a primary band (i.e., carrier aggregation or dual connection) for sufficient data throughput and/or low enough data latency. By contrast, an application having a normal or non-demanding communication demand requirement is considered non-demanding by being satisfactorily carried by only a primary band (i.e., no requirement for carrier aggregation or dual connection). RF communication subsystem 102 provides communication services for communication application 115 to ensure user experience. User Experience refers to the overall performance sense a user of the communication device of periphery device experiences when using a product, application, system, or service. Within the context of the disclosure, user experience is a broad term that can cover anything from how well the user can navigate the product, how easy the device or product is to use, how relevant the content displayed is, etc. Some immersive user interfaces such as eXtended Reality (XR) displays, have demanding communication requirements. User experience is reduced when the presentation of images is noticeably degraded due to inadequate data throughput or excessive data latency. In an example, data originating or terminating at input/output subsystem 108 of communication device 100 are communicated with external communication environment 131 to meet communication demand requirements of communication application 115.

In one or more embodiments, aspects of the present innovation are performed by communication system 190 of more than one device that includes controller 101, RF communication subsystem 102, input/output subsystem 108, and communication application 115 that operate in a distributed architecture. In an example, communication system 190 includes communication device 100, personal device(s) 145, and network device 177. Helmet mounted display device 145a of personal device(s) 145 has communication demand requirements that need carrier aggregation or dual connection by RF communication subsystem 102 to have a satisfactory user experience. Helmet mounted display device 145a is an example of a component that may not be activated or communicatively coupled to communication device 100 before user 146 intends to use helmet mounted display device 145a. Preparatory steps to use helmet mounted display device 145a can trigger controller 101 to prepare for activation of helmet mounted display device 145a to ensure good user experience. In an example, virtual or augmented imagery should be complete and synchronized with head movements for a good user experience. User experience is degraded when the imagery is incomplete or lags in time, thus becoming not synchronized with head movements. Having communication device 100 prepared for activation of helmet mounted display device 145a, which is bandwidth demanding, provides for a good user experience during initial activation.

Figure 2:
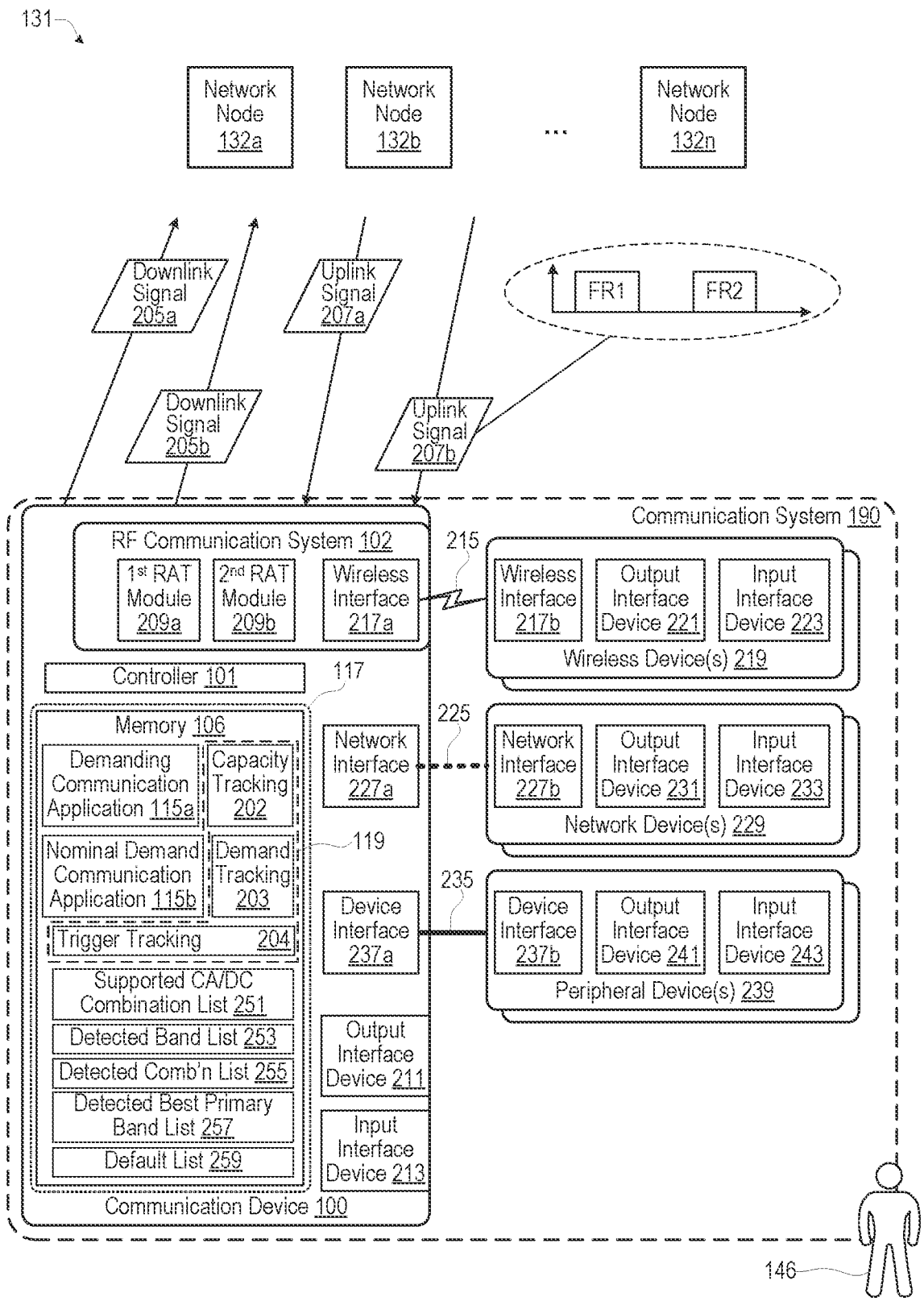
FIG. 2 depicts an example communication system that selects and camps on one network node using either a primary cell selection procedure when the demanding application requires a data connection or a default primary cell selection procedure when a non-demanding application or no application requires a data connection, according to one or more embodiments.

FIG. 2 illustrates an example of communication system 190 being provided communication services by external communication environment 131, represented by first, second, and nth network nodes 132a, 132b, and 132n. RF communication subsystem 102 selects and camps on one of network nodes 132a, 132b, and 132n using primary cell selection procedure when demanding application 115a requires a data connection. RF communication subsystem 102 selects and camps on one of network nodes 132a, 132b, and 132n using a default primary cell selection procedure when normal demand application 115b or no application requires a data connection. For clarity, two levels of communication demand requirements are depicted by communication applications 115a-115b. However, aspects of the present disclosure can extend to graduations of communication demand requirements that further include particular combinations of primary band and secondary band(s) that satisfy some but not all of the communication demand requirements for carrier aggregation or dual connection of the various applications. In an example, a particular combination may have an intermediate level of data throughput that can support a mid-level demanding communication application that is less demanding than another higher bandwidth consuming/demanding application. Communication system 190 records, in device memory 106, historical information lookup tables 119 including: (i) capacity tracking data 202, (ii) demand tracking data 203; and (iii) trigger tracking data 204. Controller 101 may subsequently access the recorded historical information to make accurate predictions of activation of higher bandwidth consuming/demanding applications.

In one or more embodiments, communication system 190 tracks historical usage to make more accurate predictions of activation of demanding communication application 115a, to more accurately assess communication demand requirements of demanding communication application 115a, and to more accurate assess a capacity of particular combinations of a primary band and at least one secondary band to satisfy the communication demand requirement. Communication device 100 tracks historical information such as capacity tracking data 202, demand tracking data 203, and trigger tracking data 204. In one or more or more embodiments, to identify the communication capacity of each combination of primary band and the at least one secondary band, controller 101: (i) tracks location and time of day of historical occurrences of attempting one of carrier aggregation and dual connection with particular combinations of primary band and at least one secondary band; (ii) identifies one or more of bandwidth, latency and quality capacity (BLQC) of the historical occurrences; and (iii) records the BLQC of the historical occurrence with an associated location and time of day for later referencing in assessing communication capacity.

In one or more embodiments, when the data connection occurs, the communication demand requirement may be satisfied by one or more downlink signals 205a-205b as primary bands and secondary band(s) respectively for downlink carrier aggregation or dual connection. In an example, the carrier aggregation or dual connection is represented by a lower first frequency component ("FR1") and a higher second frequency component ("FR2"). In one or more embodiments, when the data connection occurs, the communication demand requirement may be satisfied by one or more uplink signals 207a-207b as uplink primary bands and secondary band(s) respectively for carrier aggregation or dual connection. In one or more embodiments, when the data connection occurs, the communication demand requirement may be satisfied by one or more downlink signals 205a-205b as primary bands and secondary band(s) respectively for downlink carrier aggregation or dual connection and by one or more uplink signals 207a-207b as primary bands and secondary band(s) respectively for uplink carrier aggregation or dual connection. RF communication subsystem 102 may be provisioned with one or more radio access technology (RAT) modules 209a-209b to support respective RATs, with the same RAT being used for carrier aggregation and different RATs being used for dual connection.

Communication system 190 may consist entirely of communication device 100, which supports power efficient preparation for carrier aggregation or dual connection that is proactively performed in accordance with aspects of the present disclosure. The communication demand requirement may be defined for data terminating at output interface device 211 at communication device 100 (i.e., a downlink communication demand requirement). The communication demand requirement may be defined for data originating at input interface device 213 at communication device 100 (i.e., an uplink communication demand requirement). In one or more embodiments, communication system 190 may, at least in some instances, include one or more wireless devices 219. Communication device 100 communicatively couples over airlink 215 via respective wireless interfaces 217a-217b with one or more wireless devices 219. When active, wireless devices 219 may impose a downlink communication demand requirement to support data terminating at output interface device 221. When active, wireless devices 219 may impose an uplink communication demand requirement for data originating at input interface device 223. In one or more embodiments, communication system 190 may, at least in some instances, include one or more network devices 229. Communication device 100 communicatively couples over network cable 225 via respective network interfaces 227a-227b with one or more network devices 229. When active, network devices 229 may impose a downlink communication demand requirement to support data terminating at output interface device 231. When active, network devices 229 may impose an uplink communication demand requirement to support data originating at input interface device 233. In one or more embodiments, communication system 190 may, at least in some instances, include one or more peripheral devices 239. Communication device 100 communicatively couples over peripheral connection or cable 235 via respective device interfaces 237a-237b with one or more peripheral devices 239. When active, peripheral devices 239 may impose a downlink communication demand requirement to support data terminating at output interface device 241. When active, peripheral devices 239 may impose an uplink communication demand requirement to support data originating at input interface device 243. In one or more embodiments, wireless devices 219, network devices 229, or peripheral devices 239 may be worn or carried by user 146.

In a first example, RF communication subsystem 102 receives information from network nodes 132a, 132b, and 132n and measures signal strength and signal quality of broadcast signals from network nodes 132a, 132b, and 132n. Communication system 190 creates and maintains information for selecting, camping on, and connecting to particular ones of network nodes 132a, 132b, and 132n. In one or more embodiments, communication system 190 stores in device memory 106: (i) supported carrier aggregation/dual connection (CA/DC) combination list 251; (ii) detected band list 253; (iii) detected combination list 255; (iv) detected best primary band list 257; and (v) default list 259.

In a first example for carrier aggregation of FR1+FR2, supported carrier aggregation/dual connection (CA/DC) combination list 251 has filename "Supported_CA_combo_list[ ]" in TABLE 1A.

TABLE 1A

| Supported_CA_combo_list[ ] |
|---|
| . . . |
| CA_n5A-n77A-n261A |
| CA_n66A-n77A-n261A |
| CA_n2A-n77A-n261A |
| CA_n77A-n261A |
| CA_n7A-n78A-n258A |
| . . . |

Supported CA/DC combination list 251 includes detected bands and cells that are sorted on network priority and signal power/quality. Each entry includes channel bandwidth, number of component carriers (CCs), and subcarrier spacing. Detected band list 253 has filename "detected_band_list[ ]" in TABLE 1B.

TABLE 1B

| detected_band_list[ ] | NW Priority | Channel · BW (MHz) | Subcarrier Spacing (kHz) | Number of CCs | Signal Power/Quality (dBm/dB) |
|---|---|---|---|---|---|
| n5 | 7 | 10 | 15 | 1 | −80/−10 |
| n77 | 5 | 50 | 30 | 2 | −90/−12 |
| n258 | 6 | 50 | 120 | 4 | −75/−11 |
| n261 | 6 | 100 | 240 | 8 | −85/−10 |

Detected band list 253 includes suitable carrier aggregation or dual connection band combinations that the communication device can support if available. Detected combination list 255 has filename "detected_combo_list[ ]" in TABLE 1C.

TABLE 1C

| detected_combo_list[ ] | Comment |
|---|---|
| CA_n5A-n77A-n261A | BW = 160 MHz, CC = 11, SS = 240 KHz, Pri(7, 6), num_FR2_bands = 1 |
| CA_n77A-n261A | BW = 150 MHz, CC = 10, SS = 240 KHz, Pri (5, 6), num_FR2_bands = 1 |

Detected combination list 255 includes suitable carrier aggregation or dual connection combinations that are both indicated as supported in the supported combinations list and detected as available at a current location of the communication device. The detected combinations list may be filtered for ones spanning the largest aggregate bandwidth, number of CCs, maximum carrier spacing and number of highest frequency bands. Detected best primary band list 257 has filename "best_detected_PCell_list[ ]" in TABLE 1D.

TABLE 1D

| best_detected_PCell_list[ ] |
|---|
| n5 |
| n77 (Backup if n5 fails) |

Detected best primary band list 257 includes bands or cells sorted in selection priority. The communication device loops or scans through the detected combination list and pulls or identifies a highest remaining combination for which the primary band or cell is at the top of detected band list. The primary band will provide carrier aggregation or dual connection combinations that offer a balance of largest bandwidth, number of CCs and carrier spacing, while meeting network-defined band priority and signal quality thresholds. In the first example, controller 101 selects (i.e., camps on) n5.

In a second example for dual connection case of FR1+FR2, supported CA/DC combination list 251 is provided in TABLE 2A.

TABLE 2A

| Supported_CA_combo_list[ ] |
|---|
| ... |
| CA_n5A-n77A-n261A |
| CA_n66A-n77A-n261A |
| CA_n2A-n77A-n261A |
| CA_n77A-n261A |
| CA_n7A-n78A-n258A |
| ... |

Detected band list 253 is provided in TABLE 2B.

TABLE 2B

| detected_band_list[ ] | NW Priority | Channel · BW (MHz) | Subcarrier Spacing (kHz) | Number of CCs | Signal Power/Quality (dBm/dB) |
|---|---|---|---|---|---|
| n5 | 7 | 10 | 15 | 1 | −80/−10 |
| n77 | 5 | 50 | 30 | 2 | −90/−12 |
| n258 | 6 | 50 | 120 | 4 | −75/−11 |
| n261 | 6 | 100 | 240 | 8 | −85/−10 |

Detected combination list 255 is provided in TABLE 2C.

TABLE 2C

| detected_combo_list[ ] | Comment |
|---|---|
| CA_n5A-n77A-n261A | BW = 160 MHz, CC = 11, SS = 240 KHz, Pri(7, 6), num_FR2_bands = 1 |
| CA_n77A-n261A | BW = 150 MHz, CC = 10, SS = 240 KHz, Pri (5, 6), num_FR2_bands = 1 |

Detected best primary band list 257 is provided in TABLE 2D.

TABLE 2D

| best_detected_PCell_list[ ] |
|---|
| n5 |
| n77 (Backup if n5 fails) |

In the second example, controller 101 selects (camps on) n5.

In a third example, first frequency band contiguous or non-contiguous, supported CA/DC combination list 251 is provided in TABLE 3A.

TABLE 3A

| Supported_CA_combo_list[ ] |
|---|
| ... |
| CA_n5A-n77A-n261A |
| CA_n66A-n77A-n261A |
| CA_n2A-n77A-n261A |

Detected band list 253 is provided in TABLE 3B.

TABLE 3B

| detected_band_list[ ] | NW Priority | Channel · BW (MHz) | Subcarrier Spacing (kHz) | Number of CCs | Signal Power/Quality (dBm/dB) |
|---|---|---|---|---|---|
| n5 | 7 | 10 | 15 | 1 | −80/−10 |
| n77 | 5 | 50 | 30 | 2 | −90/−12 |
| n261 | 6 | 50 | 120 | 4 | −75/−11 |

Detected combination list 255 is provided in TABLE 3C.

TABLE 3C

| detected_combo_list[ ] | Comment |
|---|---|
| CA_n5A-n77A-n261A | BW = 160 MHz, CC = 11, SS = 240 KHz, Pri(7, 6), num_FR2_bands = 1 |
| CA_n77A-n261A | BW = 150 MHz, CC = 10, SS = 240 KHz, Pri (5, 6), num_FR2_bands = 1 |

Detected best primary band list 257 is provided in TABLE 3D.

TABLE 3D

| best_detected_PCell_list[ ] |
|---|
| N77 |
| N2 (Backup if n5 fails) |

In the third example, controller 101 selects (camps on) n77.

Figure 3:
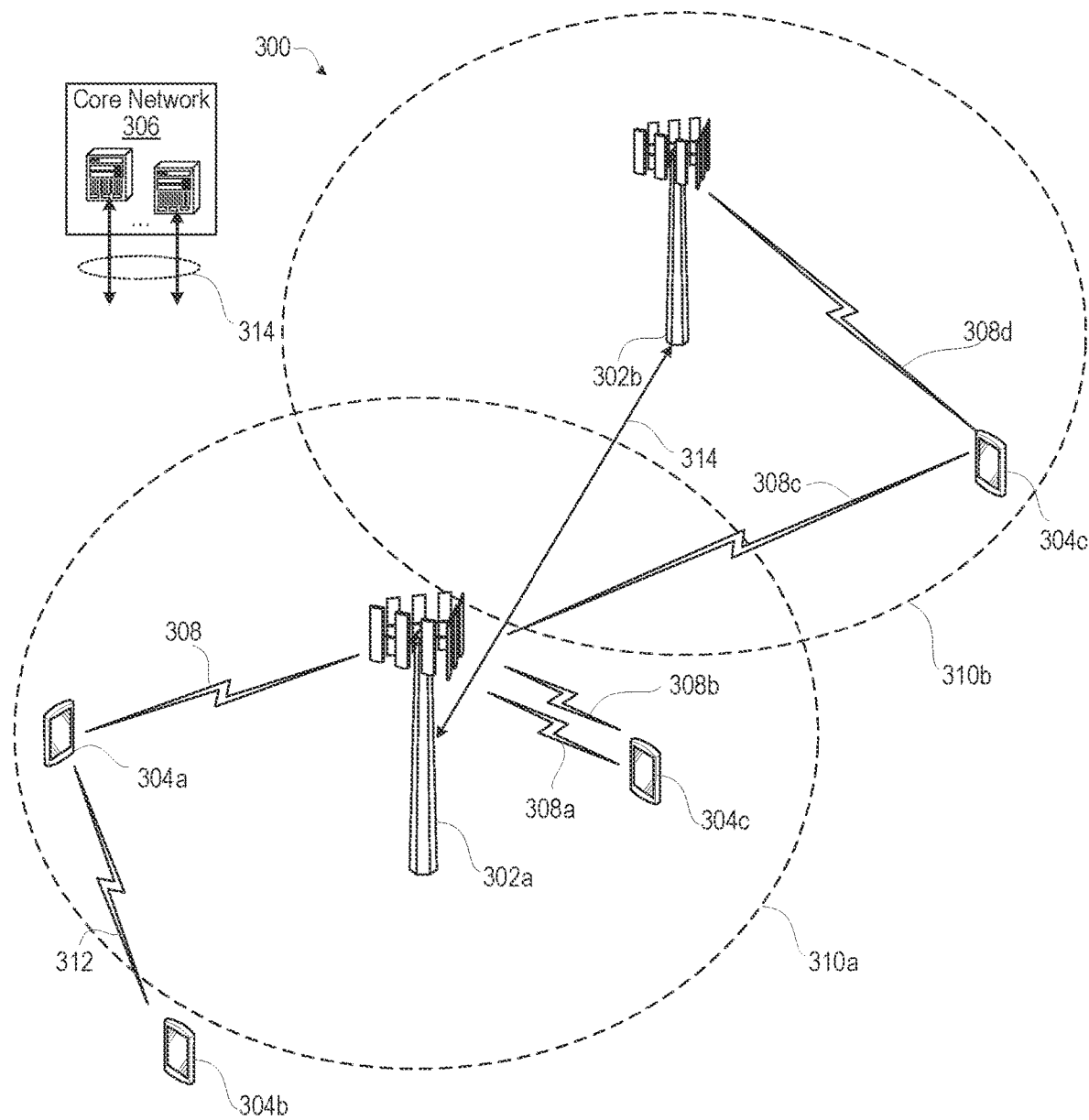
FIG. 3 illustrates an example of a wireless communication system that supports carrier aggregation or dual connection, according to one or more embodiments.

FIG. 3 illustrates an example of wireless communication system 300 that supports carrier aggregation or dual connection in accordance with aspects of the present disclosure. Wireless communication system 300 may include one or more base stations 302a-302b, one or more user equipments (UEs) 304a-304d (collectively "304"), and core network 306. Wireless communication system 300 may support various radio access technologies. In some implementations, the wireless communication system 300 may be a 4G network, such as an LTE network or an LTE-Advanced (LTE-A) network. In some other implementations, the wireless communication system 300 may be a 5G network, such as a new radio (NR) network. In other implementations, wireless communication system 300 may be a combination of a 4G network and a 5G network. Wireless communication system 300 may support radio access technologies beyond Additionally, wireless communication system 300 may support different transmission modes, such as time division multiple access (TDMA), frequency division multiple access (FDMA), or code division multiple access (CDMA), etc.

One or more of base stations 302a-302b may be dispersed throughout a geographic region to form wireless communication system 300. One or more of base stations 302a-302b may be, may include, or may be referred to as a base transceiver station, an access point, a NodeB, an eNodeB (eNB), a next-generation NodeB (gNB), or by other suitable terminology. Base station 302a-302b and UE 304a-304d may communicate via communication link 308, which may be a wireless or wired connection. For example, base station 302a-302b and UE 304a-304d may wirelessly communication over a user unit (Uu) interface.

Base station 302a may provide geographic coverage area 310a for which base station 302a may support services (e.g., voice, video, packet data, messaging, broadcast, etc.) for one or more UEs 304a-304d within geographic coverage area 310a. Similarly, base station 302b may provide geographic coverage area 310b for which base station 302b may support services (e.g., voice, video, packet data, messaging, broadcast, etc.) for one or more UEs 304a-304d within geographic coverage area 310b according to one or multiple radio access technologies. In some implementations, base station 302a-302b may be moveable, for example, a satellite associated with a non-terrestrial network. In some implementations, different geographic coverage areas 310a-310b associated with the same or different radio access technologies may overlap, but the different geographic coverage areas 310a-310b may be associated with different base stations 302a-302b.

One or more UEs 304a-304d may be dispersed throughout a geographic region of wireless communication system 300. UE 304a-304d may include or may be referred to as a mobile device, a wireless device, a remote device, a handheld device, or a subscriber device, or some other suitable terminology. In some implementations, UE 304a-304d may be referred to as a unit, a station, a terminal, or a client, among other examples. Additionally, or alternatively, the UE 304a-304d may be referred to as an Internet-of-Things (IoT) device, an Internet-of-Everything (IoE) device, or machine-type communication (MTC) device, among other examples. In some implementations, UE 304a-304d may be stationary in wireless communication system 300. In some other implementations, UE 304a-304d may be mobile in wireless communication system 300.

One or more UEs 304a-304d may be devices in different forms or devices having different capabilities. UEs 304a-304d may be capable of communicating with various types of devices, such as base stations 302a-302b (collectively "302"), other UEs 304a-304d, or network equipment (e.g., core network 306, a relay device, an integrated access and backhaul (IAB) node, or another type of network equipment), as shown in FIG. 3. Additionally, or alternatively, UE 304a-304d may support communication with other base stations 302a-302b or UEs 304a-304d, which may act as relays in the wireless communication system 300. In an example, UE 304a is in coverage area 310a of base station 302a and acts as relay over communication link 312 for UE 304b that is outside of coverage area 310a.

UE 304a-304d may also be able to support wireless communication directly with other UEs 304a-304d as part of an ad hoc network that is not scheduled by base stations 302a-302b. For example, UE 304a may support wireless communication directly with another UE 304b over a device-to-device (D2D) communication link designated as "PC5" and known as sidelink at the physical layer. Vehicle-to-vehicle (V2V) deployments, vehicle-to-everything (V2X) deployments, and cellular-V2X deployments are examples of D2D communication. UE 304a may support wireless communication directly with another UE 304b over the PC5 interface. UEs 304a-304d can proactively select a primary band according to aspects of the present disclosure to prepare for activation of a demanding application that requires carrier aggregation or dual connection for high data throughput, low data latency, or at least a minimum level of quality. Quality can be defined in terms of error rate or other attributes. In an example, error encoding of a signal may be sufficient to overcome up to a threshold data error rate without degradation. Error rates higher than this threshold result in degraded decoding or a requirement to resend data, which results in data latency. Higher data throughput has a relationship with latency and quality in that an increased amount of data encoding to correct for errors can be supported and more automatic repeats of transmissions of data can be supported to ensure timely reception for sequential decoding. In an example, UE 304c is communicating via two simultaneous downlink signals 308a-308b operating cooperatively for carrier aggregation with base station 302a. In another example, UE 304d is communicating via uplink signals 308c-308d respectively with base stations 302a-302b using a dual connection.

Base stations 302a-302b may support communications with core network 306, with another base station 302a-302b, or with both. For example, base stations 302a-302b may interface with core network 306 through one or more backhaul links 314 (e.g., via an S1, N2, N2, or another network interface). The base stations 302a-302b may then communication with each other over backhaul links 314 (e.g., via X2, Xn, or another network interface). Core network 306 may support user authentication, access authorization, tracking, connectivity, and other access, routing, or mobility functions. Core network 306 may be an evolved packet core (EPC), or a 5G core (5GC)

Figure 4:
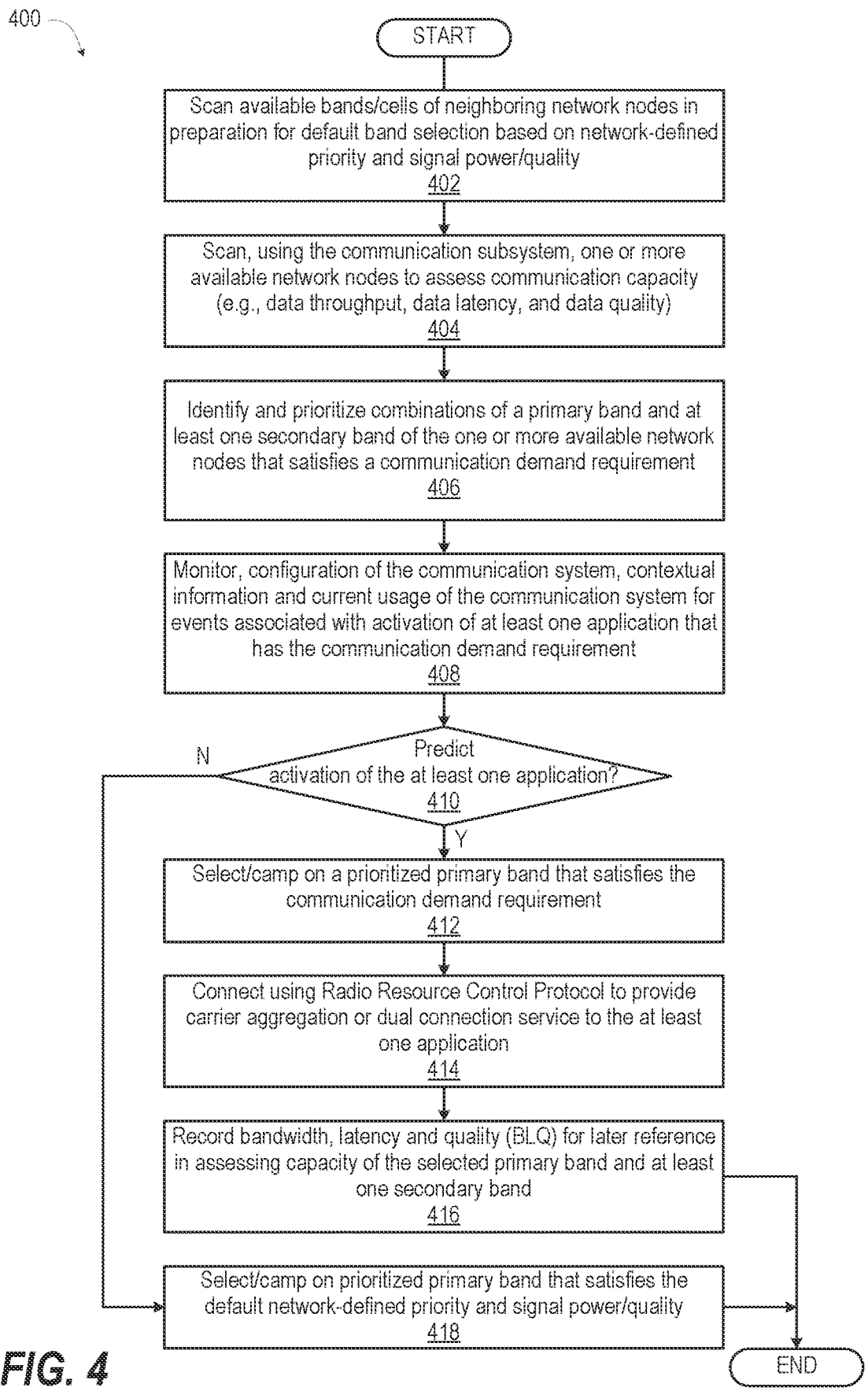
FIG. 4 presents a flow diagram of a method performed by a communication device for timely preparation in boot or idle mode for a data connection for a demanding application, according to one or more embodiments.
Figure 5A:
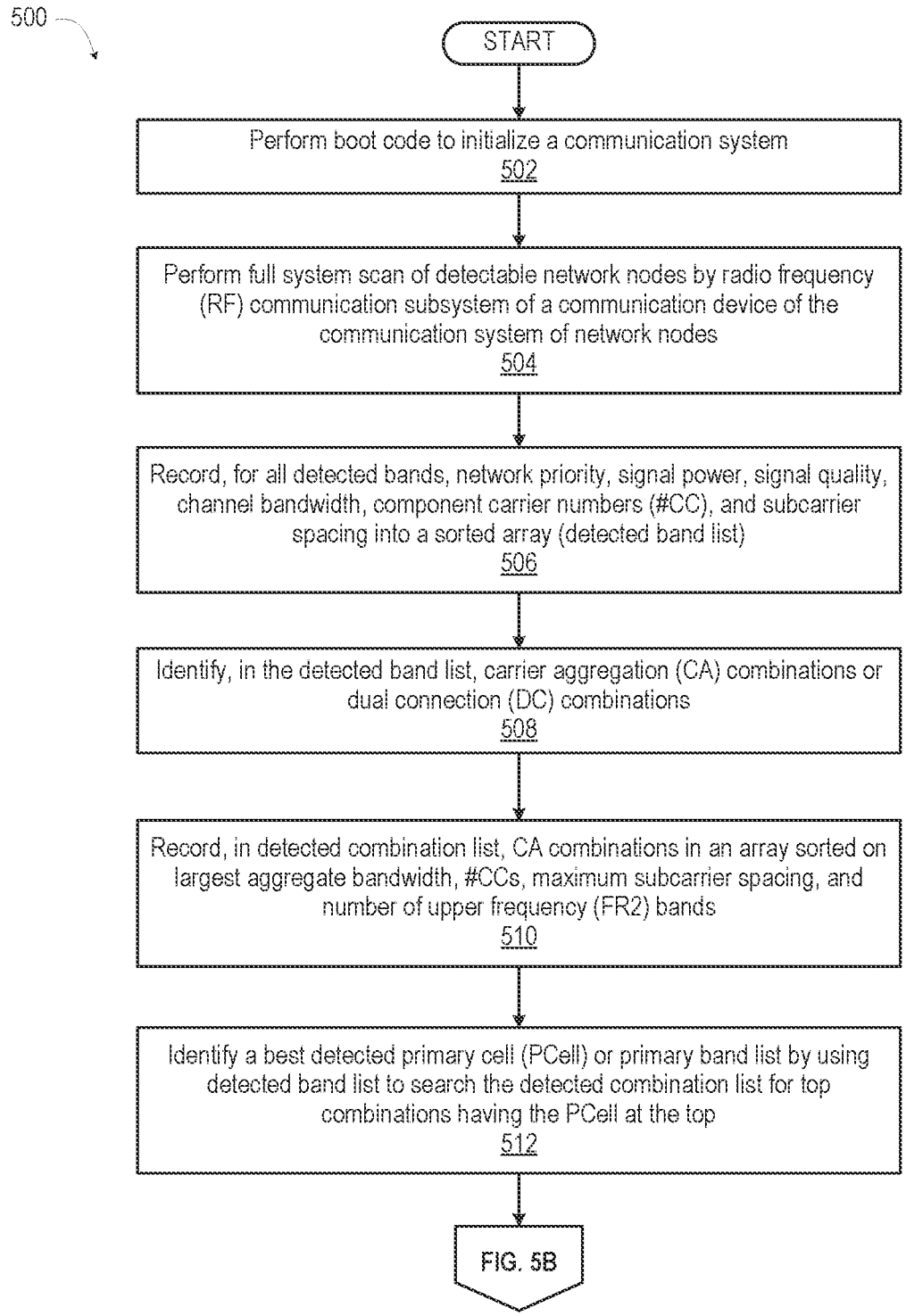
FIGS. 5A-5B (collectively "FIG. 5") presents a flow diagram of a method performed by the communication system in boot mode to provide additional functionality to the method of FIG. 4 by generating lists of appropriate and available bands that meet communication demand requirements of the demanding application, according to one or more embodiments.
Figure 5B:
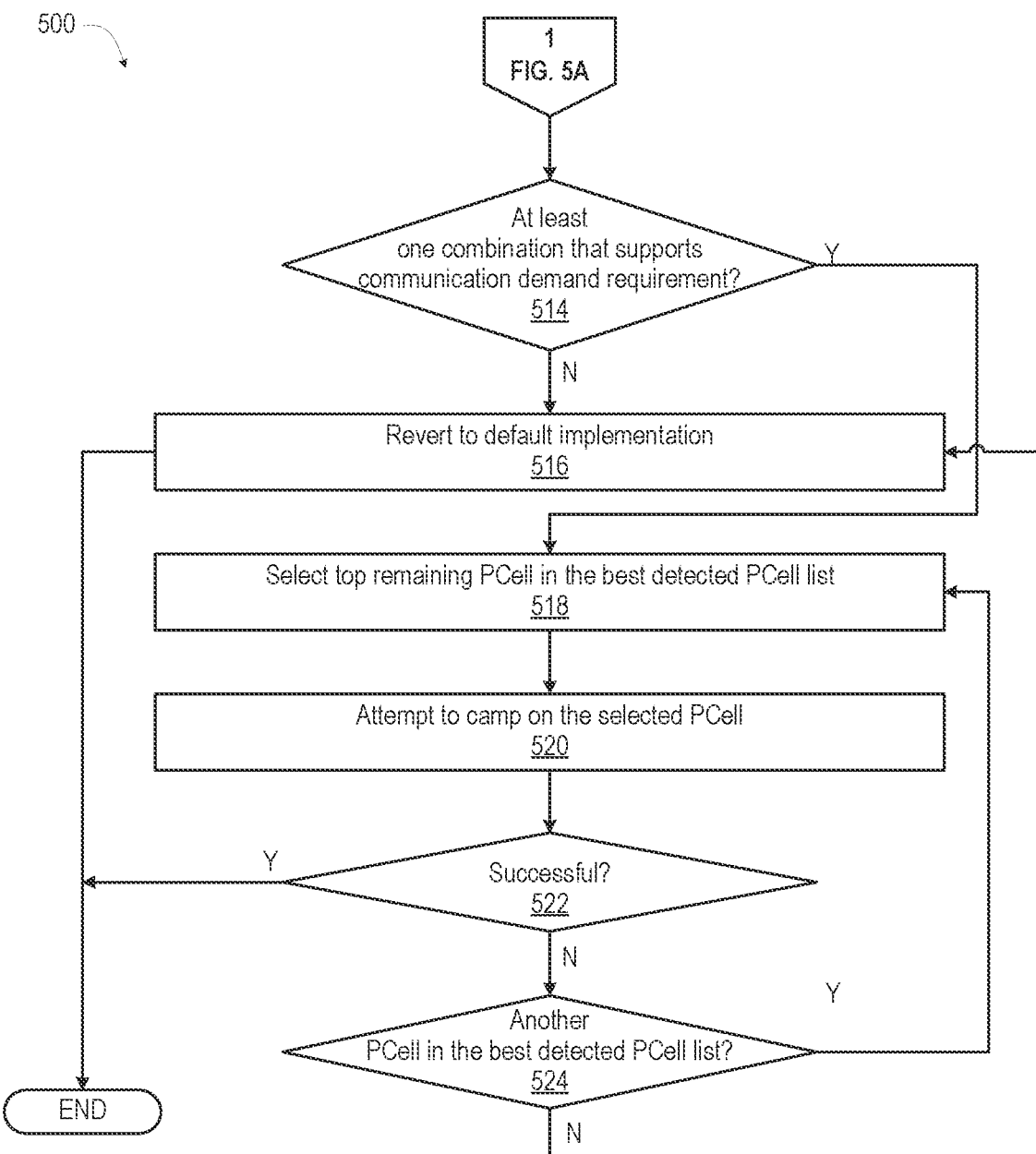
Figure 6:
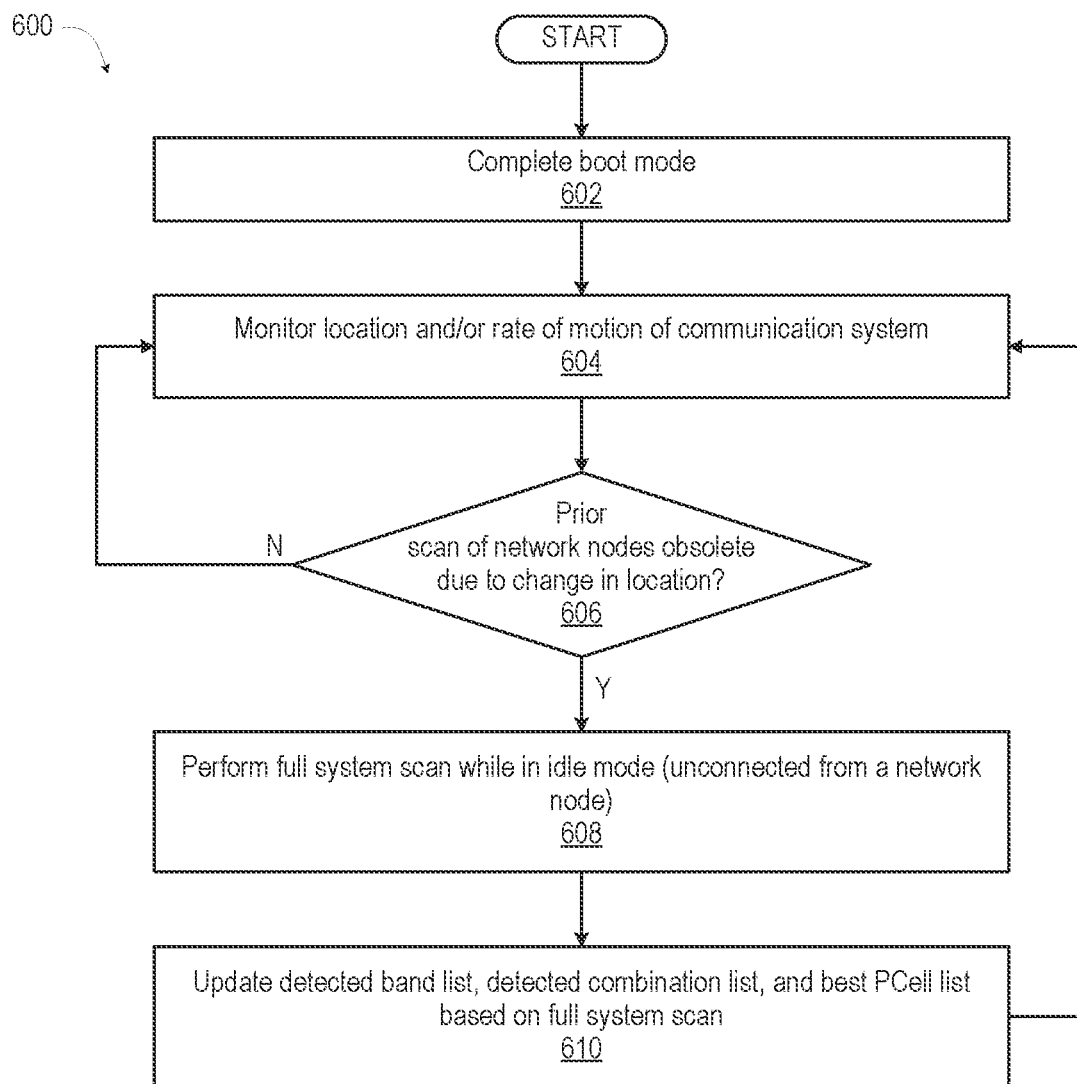
FIG. 6 presents a flow diagram of a method performed by the communication system after completion of the boot mode to provide additional functionality to the method of FIG. 4 by identifying and updating results of a full system scan that are obsolete, according to one or more embodiments.
Figure 7A:
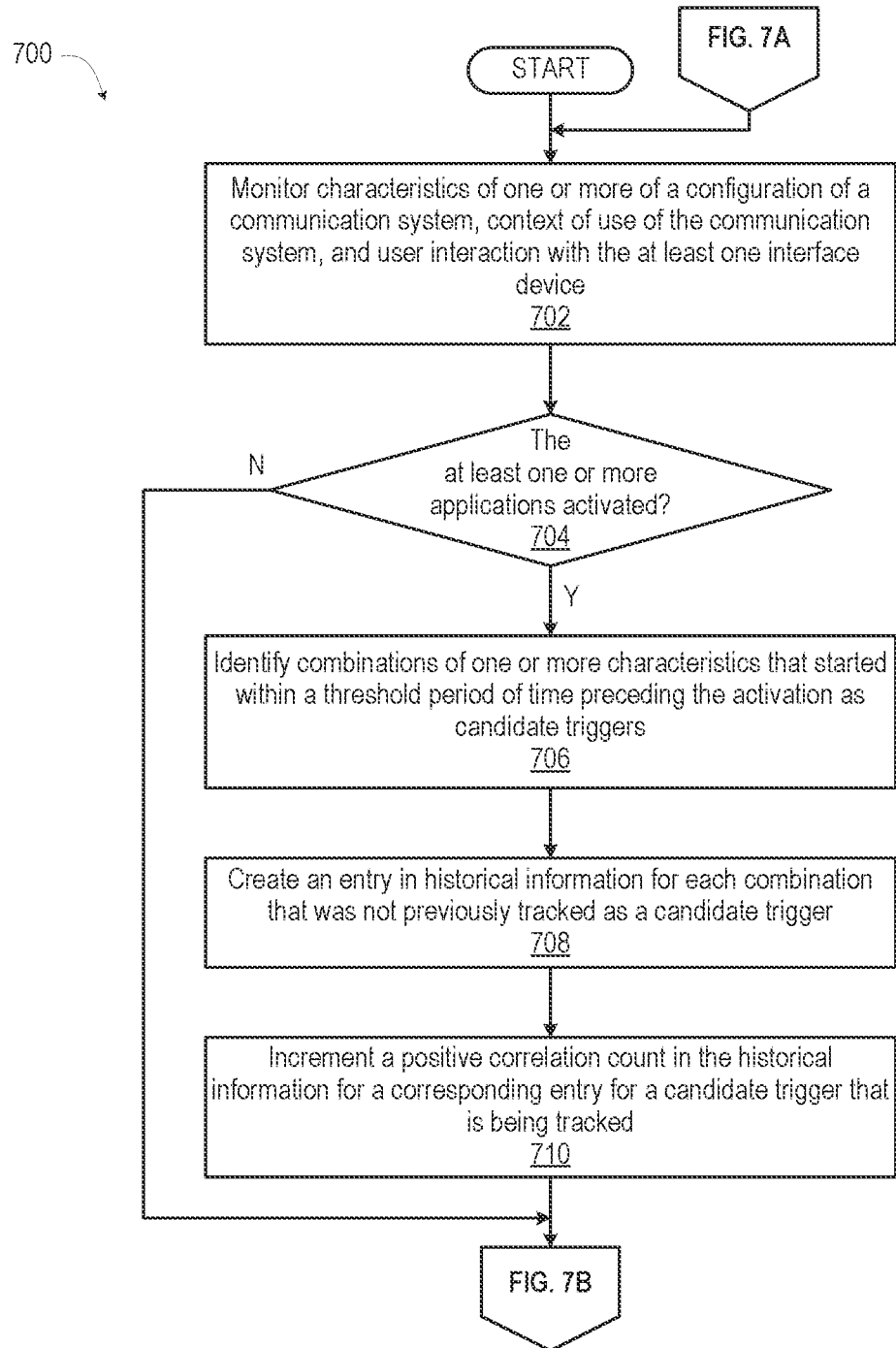
FIGS. 7A-7B (collectively "FIG. 7") present a flow diagram of method 700 performed by the communication system for identifying triggers based on historical occurrences that can predict activation of a "demanding" application in order to provide additional functionality to the method of FIG. 4, according to one or more embodiments.
Figure 7B:
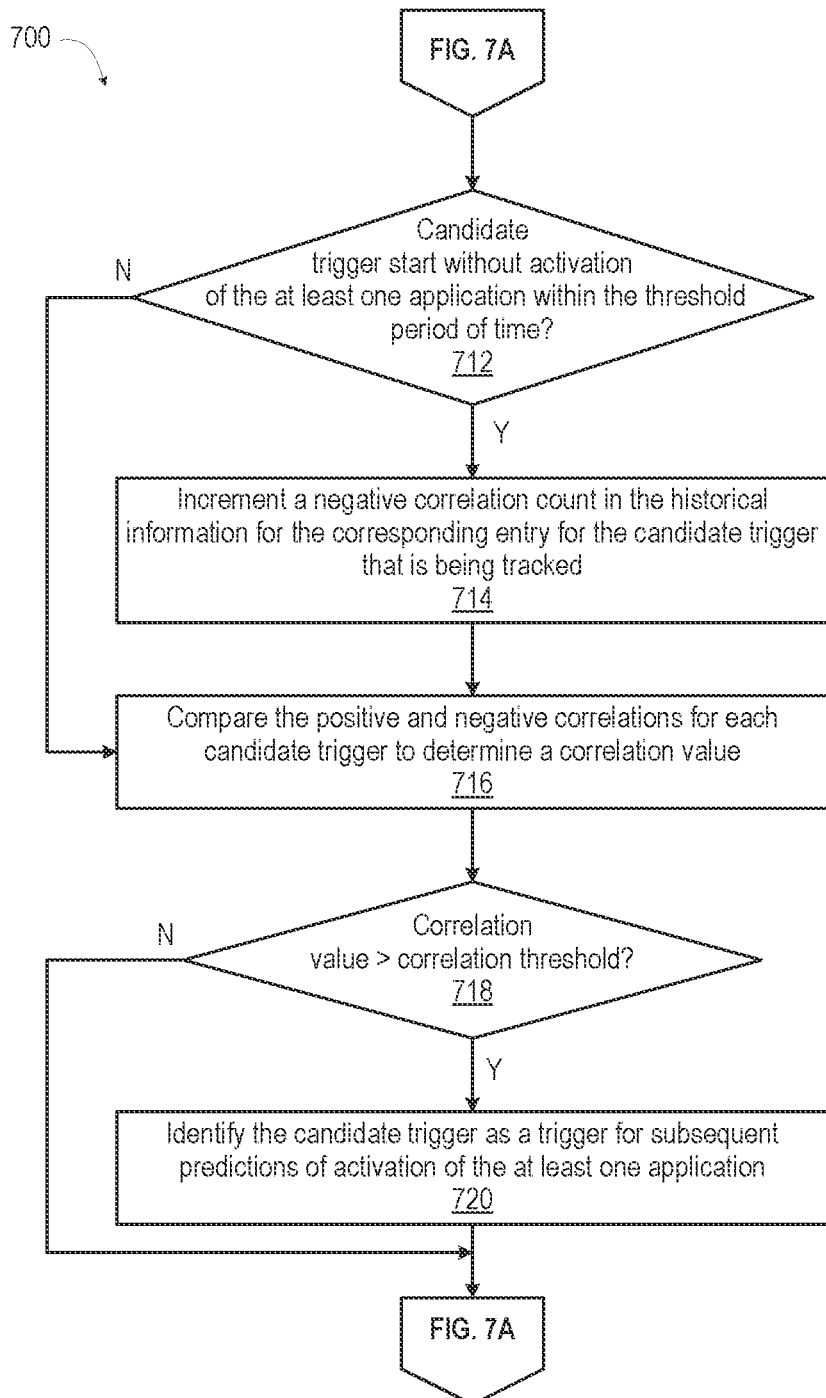
Figure 8A:
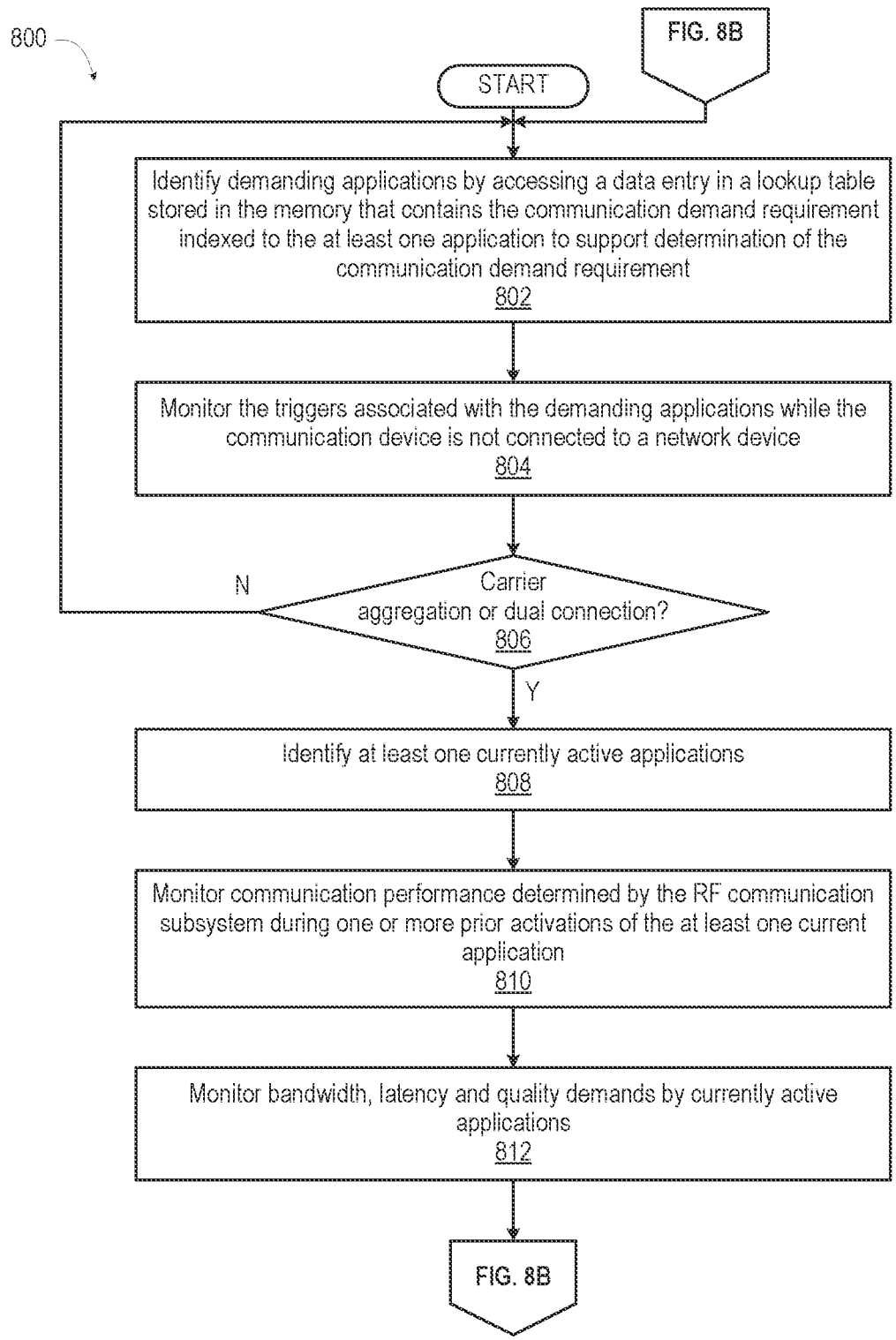
FIGS. 8A-8B (collectively FIG. 8) present a flow diagram of a method for storing, in a lookup table, the communication demand requirement that is sufficient to support the at least one application during a subsequent activation based on the one or more prior activations, in order to provide additional functionality to the method of FIG. 4.
Figure 8B:
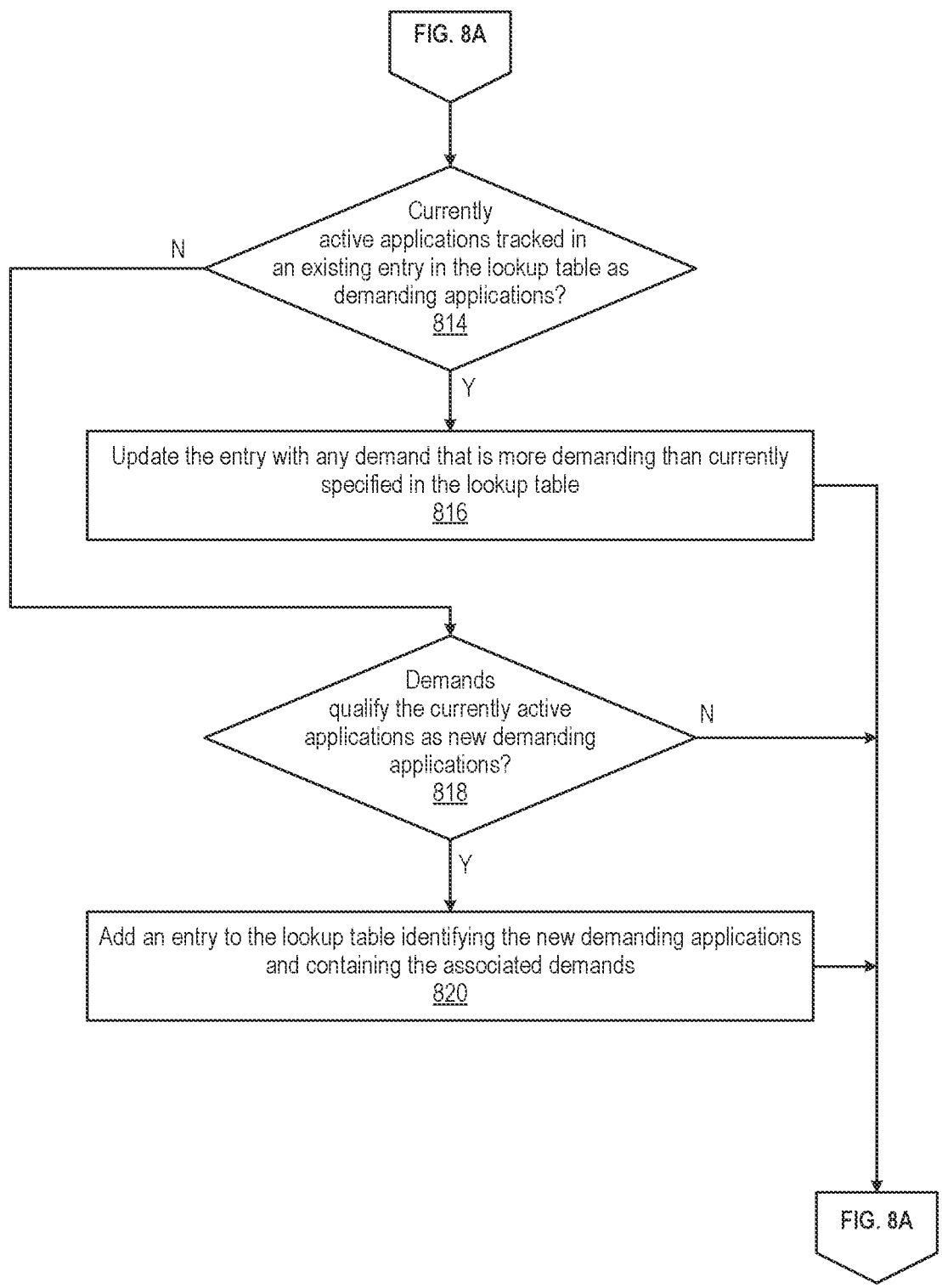

FIG. 4 presents a flow diagram of method 400 performed by a communication device (e.g., 100) for timely preparation, while in boot or idle mode, of a data connection for a demanding application that requires high data throughput, low data latency or at least a minimum level of quality. FIGS. 5A-5B (collectively "FIG. 5") present a flow diagram of method 500 performed by the communication system in boot mode to provide additional functionality to method 400 of FIG. 4. Specifically, method 500 (FIGS. 5A-5B) provides processes for creating lists of appropriate and available bands that meet communication demand requirements of the demanding application as well as for reverting to default band selection for power savings when the communication demand requirements are not expected. FIG. 6 presents a flow diagram of method 600 performed by the communication system to provide additional functionality to method 400 of FIG. 4 when the communication system is subsequently in idle mode after completion of the boot mode of FIGS. 5A-5B. Method 600 (FIG. 6) provides processes for determining when updates are needed to the lists of appropriate and available bands that meet communication demand requirements of the demanding application as well as for reverting to default band selection for power savings when the communication demand requirements are not expected. FIGS. 7A-7B (collectively FIG. 7) present a flow diagram of method 700 performed by the communication system for predicting activation of a demanding application to provide additional functionality to method 400 of FIG. 4. Method 700 (FIGS. 7A-7B) provides processes capturing historical information of one or more of configuration of the communication system, context of use of the communication system, and user interactions with the communication system that are associated with activation of a demanding application. The historical information enables more accurate predictions by the controller of the communication system of subsequent activations of the demanding application as performed in method 400 (FIG. 4). FIGS. 8A-8B (collectively FIG. 8) present a flow diagram of method 800 for storing the communication demand requirement in the lookup table that is sufficient to support the at least one application during a subsequent activation based on the one or more prior activations to provide additional functionality to method 400 of FIG. 4.

The descriptions of method 400 (FIG. 4), method 500 (FIGS. 5A-5B), method 600 (FIG. 6), method 700 (FIGS. 7A-7B), and method 800 (FIGS. 8A-8B) are provided with general reference to the specific components illustrated within the preceding FIGS. 1-3. Specific components referenced in method 400 (FIG. 4), method 500 (FIGS. 5A-5B), method 600 (FIG. 6), method 700 (FIGS. 7A-7B), and method 800 (FIGS. 8A-8B) may be identical or similar to components of the same name used in describing preceding FIGS. 1-3. In one or more embodiments, controller 101 configures communication device 100 (FIG. 1), communication system 190 (FIG. 2), or UE 304a (FIG. 3), to provide functionality of method 400 (FIG. 4), method 500 (FIGS. 5A-5B), method 600 (FIG. 6), method 700 (FIGS. 7A-7B), and method 800 (FIGS. 8A-8B).

With reference to FIG. 4, method 400 includes scanning, using a radio frequency (RF) communication subsystem of a communication system, available bands/cells of neighboring network nodes in preparation for default band selection, based on network-defined priority and signal power/quality (block 402). The RF communication subsystem has more than one communication chain comprising at least a first communication chain and a second communication chain configurable to operate in at least one of carrier aggregation mode and dual connection mode to satisfy a communication demand requirement of at least one application stored in memory of the communication system. The at least one application is "demanding" in that one of carrier aggregation mode and dual connection mode is necessary to provide one or more of sufficiently high data throughput/bandwidth and sufficiently low data latency. In one or more embodiments, the at least one application is demanding in that one or more of carrier aggregation and dual connection is required to meet a level of quality. The level of quality may define a quality of service. Method 400 includes scanning, using the RF communication subsystem, one or more available network nodes to assess communication capacity (e.g., data throughput, data latency, and data quality) (block 404). Method 400 includes identifying and prioritizing combinations of a primary band and at least one secondary band of the one or more available network nodes that satisfies a communication demand requirement (block 406).

In one or more embodiments, the communication demand requirement is defined for two or more downlink signals received from the one or more network nodes. In one or more embodiments, the communication demand requirement is defined for one or more uplink signals transmitted to the one or more network nodes. In one or more embodiments, the communication demand requirement is defined for one or more uplink signals transmitted to the one or more network nodes and further includes at least one of a second data throughput greater than a second throughput threshold and a second data latency less than a second latency threshold on a downlink channel received from the one or more network nodes.

In one or more embodiments, method 400 includes preparing for a data connection for a demanding application when the communication device does not have an active data connection. This "unconnected" state includes when the communication device is in a boot mode and when the communication device is in an idle mode. Conversely, when the communication device is in a connected state, a network device would generally be responsible for either supporting communication using carrier aggregation or dual connection, which may include handing over service for the communication device to another network device that can support communication using carrier aggregation or dual connection.

Method 400 includes monitoring configuration of the communication system, contextual information of current usage of the communication device, and user interaction with the communication system for trigger events that are associated with activations of at least one application that has the communication demand requirement of the at least one application that demands carrier aggregation or dual connection (block 408). In one or more embodiments, the one or more trigger events include one or more of: (i) time of day; (ii) day of week; and (iii) location of the communication system. In one or more embodiments, method 400 includes identifying the one or more trigger events based on the communicative coupling of a head mounted display device to a communication device of the communication system. In one or more embodiments, method 400 includes identifying the one or more trigger events based on receiving, at the at least one user interface device, user inputs comprising one or more of a gesture, a spoken sound, a volitional bioelectrical signal, a tactile motion, and an eye gaze direction. Method 400 includes determining whether activation of the at least one application is predicted (decision block 410). In response to determining that activation of the at least one application is expected, method 400 includes selecting and camping on a prioritized primary band that satisfies the communication demand requirement (block 412). Subsequently, method 400 includes connecting using radio resource control (RRC) protocol to provide carrier aggregation or dual connection to the at least one application (block 414). Method 400 includes recording bandwidth, latency and quality capacity (BLQC) for later reference in assessing capacity of the selected primary band and at least one secondary band (block 416). Then method 400 ends. In response to determining that activation of the at least one demanding application is not expected, method 400 includes selecting and camping on another prioritized primary band that satisfies the default network-defined priority and signal power/quality (block 418). Then method 400 ends.

With reference to FIG. 5A, method 500 includes performing boot code to initialize a communication system (block 502). Method 500 includes performing a full system scan of network nodes (block 504). In one or more embodiments, method 500 includes scanning, using the RF communication subsystem, the one or more available network nodes to identify signal strength and signal quality of each node. Method 500 includes identifying a default combination of a primary band and at least one secondary band of the one or more available network nodes that has a best combination of signal strength and signal quality. Method 500 includes recording, for all detected bands, network priority, signal power, signal quality, channel bandwidth, component carrier numbers (#CC), and subcarrier spacing into a sorted array (detected band list) (block 506). Method 500 includes identifying, in the detected band list, carrier aggregation (CA) combinations or dual connection combinations (block 508).

Method 500 includes recording, in the detected combination list, CA combinations in an array sorted on largest aggregate bandwidth, #CCs, maximum subcarrier spacing, and number of upper frequency (FR2) bands (block 510). Method 500 includes identifying a best detected primary cell (PCell) or primary band list by using detected band list to search the detected combination list for top combinations having the PCell at the top (block 512). Then method 500 proceeds to block 514 of FIG. 5B.

With reference to FIG. 5B, method 500 includes determining whether at least one combination supports the communication demand requirement for carrier aggregation or dual connection (decision block 514). In response to determining that there is not at least one combination that supports the communication demand requirement, method 500 includes reverting to a default implementation for selecting a network-prioritized primary band or PCell based on signal power or signal quality (block 516). Then method 500 ends. In response to determining that there is at least one combination that supports the communication demand requirement, method 500 includes selecting a top remaining primary band or primary cell (PCell) in the best detected PCell list (block 518). Method 500 includes attempting to camp on the selected primary band or PCell (block 520). Method 500 includes determining whether camping on the selected primary band or PCell was successful (decision block 522). In response to determining that camping on the selected primary band or PCell was successful, method 500 ends. In response to determining that camping on the selected primary band or PCell was unsuccessful, method 500 includes determining whether another primary band or PCell is in the best detected PCell list (decision block 524). In response to determining that another primary band or PCell is in the best detected PCell list, method 500 returns to block 518. In response to determining that there are no other primary band or PCell in the best detected PCell list, method 500 returns to block 516.

In one or more embodiments, method 500 includes identifying from among multiple available combinations that satisfy the communication demand requirement, a first combination of the primary band and the at least one secondary band of the one or more network nodes that best meets the communication demand requirement with a corresponding one or more of the highest value of the data throughput and a lowest value of the data latency. In response to failing to camp on the primary band of the first combination, method 500 includes identifying a second combination of a primary band and at least one secondary band of the one or more network nodes that satisfies the communication demand requirement with a corresponding one or more of a next highest value of the data throughput and a next lowest value of the data latency. Method 500 includes selecting and camping on the primary band and configuring the RF communication subsystem to use the at least one secondary band of the second combination.

In one or more embodiments, in reverting to the default implementation, method 500 includes scanning, using the RF communication subsystem, the one or more available network nodes to identify signal strength and signal quality. Method 500 includes identifying a default combination of a primary band and at least one secondary band of the one or more available network nodes that has a best combination of signal strength and signal quality. In response to determining at least one of: (iii) the at least one application will not require a data connection with the communication network; and (iv) the communication system is moving more than a threshold velocity, method 500 includes selecting and camping on the primary band and configuring the RF communication subsystem to use the at least one secondary band of the default combination in preparation for activation of the at least one application and establishment of the data connection with the communication network.

With reference to FIG. 6, method 600 includes completing boot mode (block 602). Method 600 includes monitoring location and/or rate of motion of the communication system (block 604). Method 600 includes determining whether results of the prior full system scan of network nodes are obsolete due to a change in location (decision block 606). Generally, the uplink and downlink signals have the same characteristics when the communication device is stationary or has not moved a threshold distance from a location that the last full system scan was performed. In response to determining that the results of the prior full system scan are not obsolete, method 600 returns to block 604. In response to determining that the results of the prior full system scan are obsolete, method 600 performs the full system scan while in idle mode, unconnected from a network node (block 608). Method 600 includes updating the detected band list, detected combination list, and best PCell list based on the full system scan (block 610). Then method 600 returns to block 604.

With reference to FIG. 7A, method 700 includes monitoring characteristics of one or more of a configuration of a communication system, context of use of the communication system, and user interaction with the at least one user interface device (block 702). Method 700 includes determining whether the at least one or more applications is activated (decision block 704). In response to determining that the at least one or more applications is not activated, method 700 proceeds to block 712 (FIG. 7B). In response to determining that the at least one or more applications is activated, method 700 includes identifying combinations of one or more characteristics that started within a threshold period of time preceding the activation as candidate triggers (block 706). Method 700 includes an entry in historical information for each combination that was not previously tracked as a candidate trigger (block 708). Method 700 includes incrementing a positive correlation count in the historical information for a corresponding entry for a candidate trigger that is being tracked (block 710). Method 700 proceeds to block 712 (FIG. 7B).

With reference to FIG. 7B, in response to determining that the at least one or more applications is not activated in decision block 704 or after block 710 (FIG. 7A), method 700 includes determining whether a candidate trigger started without activation of the at least one application within the threshold period of time (decision block 712). In response to determining that a candidate trigger started without activation of the at least one application within the threshold period of time, method 700 includes incrementing a negative correlation count in the historical information for the corresponding entry for the candidate trigger that is being tracked (block 714). In response to determining that a candidate trigger did not start without activation of the at least one application within the threshold period of time in decision block 712 or after block 714, method 700 includes comparing the positive and negative correlations for each candidate trigger to determine a correlation value (block 716). Method 700 includes determining whether the correlation value is greater than a correlation threshold (decision block 718). In response to determining that the correlation value is greater than the correlation threshold, method 700 includes identifying the candidate trigger as a trigger for subsequent predictions of activation of the at least one application (block 720). The positive and negative correlation counts weight the correlation value of particular combinations with an associated likelihood of activation based on associating with historical occurrences. Then method 700 returns to block 702 (FIG. 7A). Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

With reference to FIG. 8, method 800 includes identifying demanding applications by accessing a data entry in a lookup table stored in the memory that contains the communication demand requirement indexed to the at least one application to support determination of the communication demand requirement (block 802). In one or more embodiment, the communication system receives the lookup table. Method 800 includes monitoring the triggers associated with the demanding applications while the communication device is not connected to a network device (block 804). Method 800 includes determining whether the communication subsystem of the communication device is operating in at least one of carrier aggregation and dual connection mode (decision block 806). In response to determining that the communication subsystem is not operating in one of carrier aggregation or dual connection mode, method 800 returns to block 802. In response to determining that the communication subsystem is operating in one of carrier aggregation or dual connection mode, method 800 includes identifying at least one currently active applications (block 808).

In one or more embodiments, the communication system may learn about the demand requirements of applications executed by the communication system. In an example, even if the communication system receives a lookup table with nominal demand values, a user of the communication system may use the communication system in such a way that changes the communication demand requirements for the application from the nominal default value. In another example, an application may be stored in the device memory of the communication system for which an entry is not included in the lookup table. In an additional example, the user may cause a different combination of applications to routinely execute at the same time that creates the communication demand requirement. Method 800 includes monitoring communication performance determined by the RF communication subsystem during one or more prior activations of the at least one application (block 810). In particular, method 800 includes monitoring bandwidth, latency and quality demands by the at least one currently active applications (block 812). Method 800 includes determining whether the currently active applications are currently tracked in an existing entry in the lookup table as respective demanding applications (decision block 814). In response to determining that a currently active application is currently tracked in an existing entry in the lookup table as a demanding application, method 800 includes updating the entry with any changes in the demand requirement that is more demanding than currently specified in the lookup table (block 816). In response to determining, in decision block 814 (or after block 816), that the currently active application is not currently tracked in an existing entry in the lookup table as a demanding application, method 800 includes determining whether the demands qualify the currently active application as a new demanding application (decision block 818). In response to determining the currently active application qualifies as a new demanding applications, method 800 includes adding an entry to the lookup table identifying the new demanding application and containing the associated information about the demand requirements (block 820). Then method 800 returns to block 802.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:
1. A communication system comprising:
   a memory that stores at least one application;
   a radio frequency (RF) communication subsystem having more than one communication chain comprising at least a first communication chain and a second com- munication chain configurable to operate in at least one of carrier aggregation mode and dual connection mode to satisfy a communication demand requirement; and a controller communicatively coupled to the memory and the RF communication subsystem, and which:
while the RF communication subsystem is not currently connected to one or more network nodes:
determines a communication demand requirement associated with the at least one application comprising at least one of data throughput greater than a throughput threshold and data latency less than a latency threshold;
scans, via components of the RF communication subsystem, one or more available network nodes to assess communication capacity;
identifies a combination of a primary band and at least one secondary band of the one or more available network nodes that satisfies the communication demand requirement; and
selects and camps on the primary band in preparation for activation of the at least one application and configures the RF communication subsystem to use the at least one secondary band in preparation for activation of the at least one application and for establishment of a data connection with a communication network.

2. The communication system of claim 1, wherein the controller determines the communication demand requirement by accessing a data entry in a lookup table stored in the memory that contains the communication demand requirement indexed to the at least one application.

3. The communication system of claim 2, wherein the controller:
monitors communication performance determined by the RF communication subsystem during one or more prior activations of the at least one application; and
stores the communication demand requirement in the lookup table that is sufficient to support the at least one application during a subsequent activation based on the one or more prior activations.

4. The communication system of claim 1, wherein the controller:
scans, using the RF communication subsystem, the one or more available network nodes to identify signal strength and signal quality;
identifies a default combination of a primary band and at least one secondary band of the one or more available network nodes that has a best combination of signal strength and signal quality; and
in response to determining that the at least one application will not require a data connection with a communication network, selects and camps on the primary band and configures the RF communication subsystem to use the at least one secondary band of the default combination in preparation for activation of the at least one second application.

5. The communication system of claim 1, wherein the communication demand requirement is defined for two or more downlink signals received from the one or more network nodes.

6. The communication system of claim 1, wherein the communication demand requirement is defined for one or more uplink signals transmitted to the one or more network nodes.

7. The communication system of claim 1, wherein the communication demand requirement is defined for one or more uplink signals transmitted to the one or more network nodes and further comprises at least one of a second data throughput greater than a second throughput threshold and a second data latency less than a second latency threshold on a downlink channel received from the one or more network nodes.

8. The communication system of claim 1, wherein the controller:
identifies from among multiple available combinations that satisfy the communication demand requirement, a first combination of the primary band and the at least one secondary band of the one or more network nodes that satisfies the communication demand requirement with a corresponding one or more of a highest value of the data throughput and a lowest value of the data latency; and
in response to failing to select and camp on the primary band of the first combination:
identifies a second combination of a primary band and at least one secondary band of the one or more network nodes that best meets the communication demand requirement with a corresponding one or more of a next highest value of the data throughput and a next lowest value of the data latency; and
selects and camps on the primary band and configures the RF communication subsystem to use the at least one secondary band of the second combination.

9. A method comprising:
in response to a radio frequency (RF) communication subsystem of a communication system not being currently connected to one or more network nodes, the RF communication subsystem having more than one communication chain comprising at least a first communication chain and a second communication chain configurable to operate in at least one of carrier aggregation mode and dual connection mode to satisfy a communication demand requirement of at least one application stored in memory of the communication system:
determining a communication demand requirement associated with the at least one application comprising at least one of data throughput greater than a throughput threshold and data latency less than a latency threshold;
scanning, via components of the RF communication subsystem, one or more available network nodes to assess communication capacity;
identifying a combination of a primary band and at least one secondary band of the one or more available network nodes that satisfies the communication demand requirement; and
selecting and camping on the primary band in preparation for activation of the at least one application and configures the RF communication subsystem to use the at least one secondary band in preparation for activation of the at least one application and for establishment of a data connection with a communication network.

10. The method of claim 9, wherein determining the communication demand requirement comprises accessing a data entry in a lookup table stored in the memory that contains the communication demand requirement indexed to the at least one application.

11. The method of claim 10, further comprising:
monitoring communication performance determined by the RF communication subsystem during one or more prior activations of the at least one application; and storing the communication demand requirement in the lookup table that is sufficient to support the at least one application during a subsequent activation based on the one or more prior activations.

12. The method of claim 9, further comprising:
scanning, using the RF communication subsystem, the one or more available network nodes to identify signal strength and signal quality;
identifying a default combination of a primary band and at least one secondary band of the one or more available network nodes that has a best combination of signal strength and signal quality; and
in response to determining that the at least one application will not require a data connection with a communication network, selecting and camping on the primary band and configures the RF communication subsystem to use the at least one secondary band of the default combination in preparation for activation of the at least one second application.

13. The method of claim 9, wherein the communication demand requirement is defined for two or more downlink signals received from the one or more network nodes.

14. The method of claim 9, wherein the communication demand requirement is defined for one or more uplink signals transmitted to the one or more network nodes.

15. The method of claim 9, wherein the communication demand requirement is defined for one or more uplink signals transmitted to the one or more network nodes and further comprises at least one of a second data throughput greater than a second throughput threshold and a second data latency less than a second latency threshold on a downlink channel received from the one or more network nodes.

16. The method of claim 9, further comprising:
identifying from among multiple available combinations that satisfy the communication demand requirement, a first combination of the primary band and the at least one secondary band of the one or more network nodes that satisfies the communication demand requirement with a corresponding one or more of a highest value of the data throughput and a lowest value of the data latency; and
in response to failing to select and camp on the primary band of the first combination:
identifying a second combination of a primary band and at least one secondary band of the one or more network nodes that best meets the communication demand requirement with a corresponding one or more of a next highest value of the data throughput and a next lowest value of the data latency; and
selecting and camping on the primary band and configures the RF communication subsystem to use the at least one secondary band of the second combination.

17. A computer program product comprising:
a computer readable storage device; and
program code on the computer readable storage device that when executed by a processor associated with a communication system, the program code enables the communication system to provide functionality of:
while a radio frequency (RF) communication subsystem of the communication system is not currently connected to one or more network nodes, the RF communication subsystem having more than one communication chain comprising at least a first communication chain and a second communication chain configurable to operate in at least one of carrier aggregation mode and dual connection mode to satisfy a communication demand requirement of at least one application stored in memory of the communication system:
determining a communication demand requirement associated with the at least one application comprising at least one of data throughput greater than a throughput threshold and data latency less than a latency threshold;
scanning, via components of the RF communication subsystem, one or more available network nodes to assess communication capacity;
identifying a combination of a primary band and at least one secondary band of the one or more available network nodes that satisfies the communication demand requirement; and
selecting and camping on the primary band in preparation for activation of the at least one application and configures the RF communication subsystem to use the at least one secondary band in preparation for activation of the at least one application and for establishment of a data connection with a communication network.

18. The computer program product of claim 17, wherein the program code enables the communication system to provide functionality of determining the communication demand requirement by accessing a data entry in a lookup table stored in the memory that contains the communication demand requirement indexed to the at least one application.

19. The computer program product of claim 18, wherein the program code enables the communication system to provide functionality of:
monitoring communication performance determined by the RF communication subsystem during one or more prior activations of the at least one application; and
storing the communication demand requirement in the lookup table that is sufficient to support the at least one application during a subsequent activation based on the one or more prior activations.

20. The computer program product of claim 17, wherein the program code enables the communication system to provide functionality of:
scanning, using the RF communication subsystem, the one or more available network nodes to identify signal strength and signal quality;
identifying a default combination of a primary band and at least one secondary band of the one or more available network nodes that has a best combination of signal strength and signal quality; and
in response to determining that the at least one application will not require a data connection with a communication network, selecting and camping on the primary band and configures the RF communication subsystem to use the at least one secondary band of the default combination in preparation for activation of the at least one second application.

* * * * *